(12) United States Patent
Lee et al.

(10) Patent No.: US 10,266,441 B2
(45) Date of Patent: Apr. 23, 2019

(54) WATER TREATMENT APPARATUS AND STERILIZING AND CLEANSING METHOD THEREOF

(75) Inventors: Soo-Young Lee, Seoul (KR); Jung-Gyu Jang, Seoul (KR); Ui-Son Hwang, Seoul (KR); Claude Kwon, Seoul (KR); Jung-Hwan Lee, Seoul (KR); Chul-Ho Kim, Seoul (KR); Min-Suk Chang, Seoul (KR); In-Gyue Choi, Seoul (KR)

(73) Assignee: Coway Co., Ltd (KR)

( * ) Notice: Subject to any disclaimer, the term of this patent is extended or adjusted under 35 U.S.C. 154(b) by 721 days.

(21) Appl. No.: 13/698,505

(22) PCT Filed: May 19, 2011

(86) PCT No.: PCT/KR2011/003722
§ 371 (c)(1),
(2), (4) Date: Nov. 16, 2012

(87) PCT Pub. No.: WO2011/145902
PCT Pub. Date: Nov. 24, 2011

(65) Prior Publication Data
US 2013/0062219 A1   Mar. 14, 2013

(30) Foreign Application Priority Data

May 19, 2010 (KR) .................. 10-2010-0046806
Dec. 28, 2010 (KR) .................. 10-2010-0137350
(Continued)

(51) Int. Cl.
*B01D 35/00* (2006.01)
*C02F 1/44* (2006.01)
(Continued)

(52) U.S. Cl.
CPC ............ *C02F 9/005* (2013.01); *B01D 61/025* (2013.01); *B01D 61/12* (2013.01); *C02F 1/4676* (2013.01);
(Continued)

(58) Field of Classification Search
CPC ....... C02F 1/467; C02F 1/4672; C02F 1/4674
See application file for complete search history.

(56) References Cited

U.S. PATENT DOCUMENTS 4,009,104 A * 2/1977 Behrendt et al. ............. 210/744
5,002,204 A * 3/1991 Sakai ..................... B67D 1/07
                                                    204/275.1
(Continued)

FOREIGN PATENT DOCUMENTS

CN   1388069    1/2003
JP   62-016795  1/1987
(Continued)

OTHER PUBLICATIONS

European Search Report dated Dec. 14, 2015 issued in counterpart application No. 11783784.9-1351, 8 pages.
(Continued)

*Primary Examiner* — Salil Jain
(74) *Attorney, Agent, or Firm* — The Farrell Law Firm, P.C.

(57) ABSTRACT

A water treatment apparatus capable of sterilizing a storage tank and a sterilizing and cleansing method thereof are disclosed. The water treatment apparatus includes: a filter unit purifying raw water; a storage tank connected to the filter unit and storing purified water which has been filtered through the filter unit; an electrolytic sterilizer installed between the filter unit and the storage tank, electrolyzing only purified water which has been filtered through at least a portion of the filter unit to generate sterilization water, and
(Continued)

supplying the sterilization water to the storage tank; a drain unit connected to the storage tank and discharging water accommodated in the storage tank; and a control unit controlling a water purification mode of the filter unit and a sterilization mode through the electrolytic sterilizer and the drain unit.

9 Claims, 15 Drawing Sheets

(30) Foreign Application Priority Data

Dec. 30, 2010 (KR) .................. 10-2010-0138727
Apr. 28, 2011 (KR) .................. 10-2011-0040152

(51) Int. Cl.
*C02F 1/467* (2006.01)
*C02F 9/00* (2006.01)
*B01D 61/02* (2006.01)
*B01D 61/12* (2006.01)
*C02F 1/28* (2006.01)

(52) U.S. Cl.
CPC ...... *B01D 2311/04* (2013.01); *B01D 2311/06* (2013.01); *B01D 2311/2626* (2013.01); *B01D 2311/2649* (2013.01); *B01D 2311/2692* (2013.01); *C02F 1/283* (2013.01); *C02F 1/441* (2013.01); *C02F 1/4672* (2013.01); *C02F 2209/005* (2013.01); *C02F 2209/40* (2013.01)

(56) References Cited

U.S. PATENT DOCUMENTS

| | | | | |
|---|---|---|---|---|
| 5,324,434 A | * | 6/1994 | Oikawa | C02F 1/46104 204/228.1 |
| 5,938,915 A | * | 8/1999 | Morisawa | C02F 1/4618 204/262 |
| 6,558,537 B1 | * | 5/2003 | Herrington | B01D 61/04 205/747 |
| 2003/0019764 A1 | * | 1/2003 | Baldwin | B01D 61/08 205/742 |
| 2003/0019802 A1 | * | 1/2003 | Roff | C02F 1/008 210/130 |
| 2003/0029808 A1 | | 2/2003 | Yamamoto et al. | |
| 2003/0080467 A1 | * | 5/2003 | Andrews | C02F 1/4672 264/275 |
| 2006/0226081 A1 | * | 10/2006 | Lupton | B01D 61/025 210/652 |
| 2011/0108438 A1 | * | 5/2011 | Tretheway | A23L 3/325 205/743 |
| 2011/0120921 A1 | * | 5/2011 | Kim | B67D 1/0004 210/97 |
| 2012/0012466 A1 | * | 1/2012 | Sperry | C02F 1/4618 205/334 |

FOREIGN PATENT DOCUMENTS

| | | | |
|---|---|---|---|
| KR | 1999-006742 | 2/1999 | |
| KR | 1020030096867 | 12/2003 | |
| KR | 20-0353265 | * 6/2004 | ............ B01D 35/00 |
| KR | 200353265 | 6/2004 | |
| KR | 1020060083832 | 7/2006 | |
| KR | 100647909 | 11/2006 | |
| KR | 1020070003309 | 1/2007 | |
| KR | 1020080018792 | 2/2008 | |
| KR | 100894317 | 4/2009 | |
| KR | 1020090047585 | 5/2009 | |
| KR | 1020090104572 | 10/2009 | |
| KR | 1020090128785 | 12/2009 | |
| KR | 1020110001969 | 1/2011 | |
| WO | WO 2009/038293 | 3/2009 | |
| WO | WO 2009/064119 | 5/2009 | |

OTHER PUBLICATIONS

Korean Office Action dated Dec. 14, 2017 issued in counterpart application No. 10-2011-0053520, 11 pages.
Korean Office Action dated Jan. 26, 2018 issued in counterpart application No. 10-2017-0074079, 6 pages.
Korean Office Action dated Mar. 13, 2017 issued in counterpart application No. 10-2011-0040152, 10 pages.
PCT/ISA/237 Written Opinion issued on PCT/KR2011/003722 (pp. 6).
PCT/ISA/210 Search Report issued on PCT/KR2011/003722 (pp. 3).

* cited by examiner

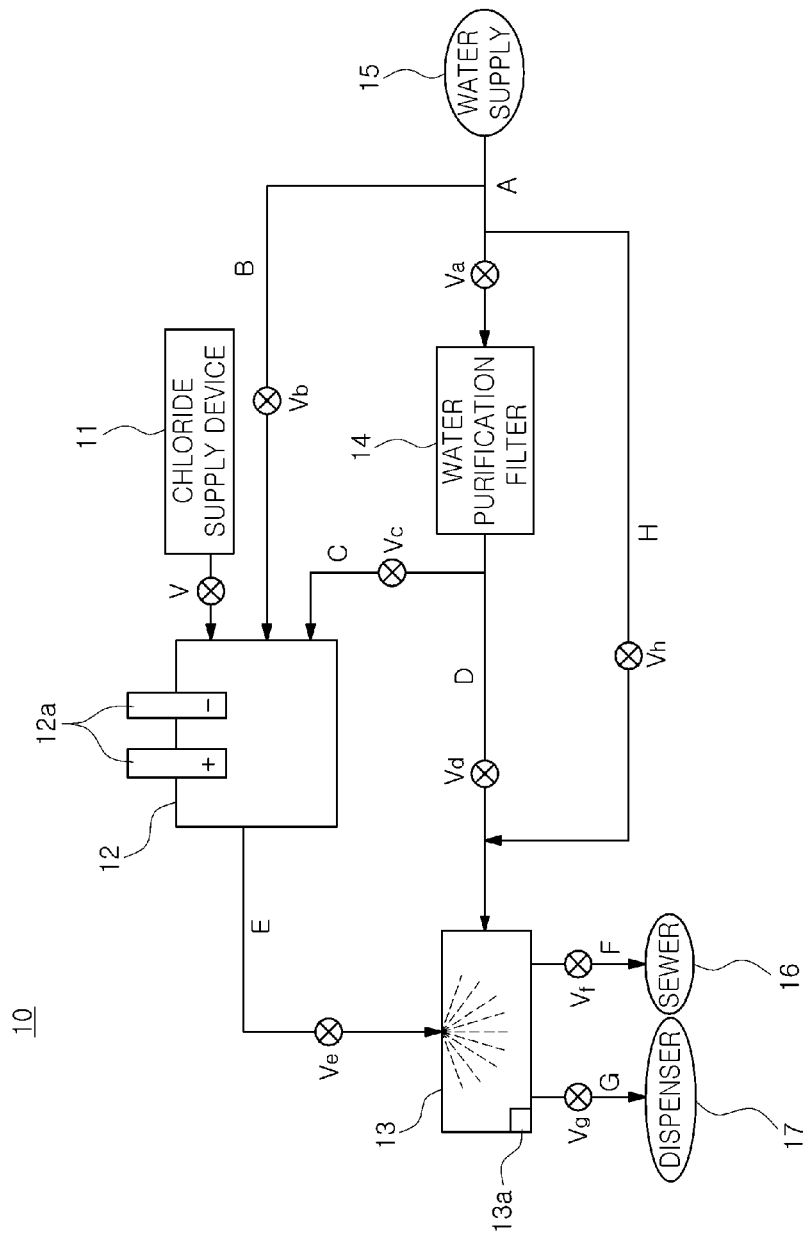
[Fig. 1]

[Fig. 2]
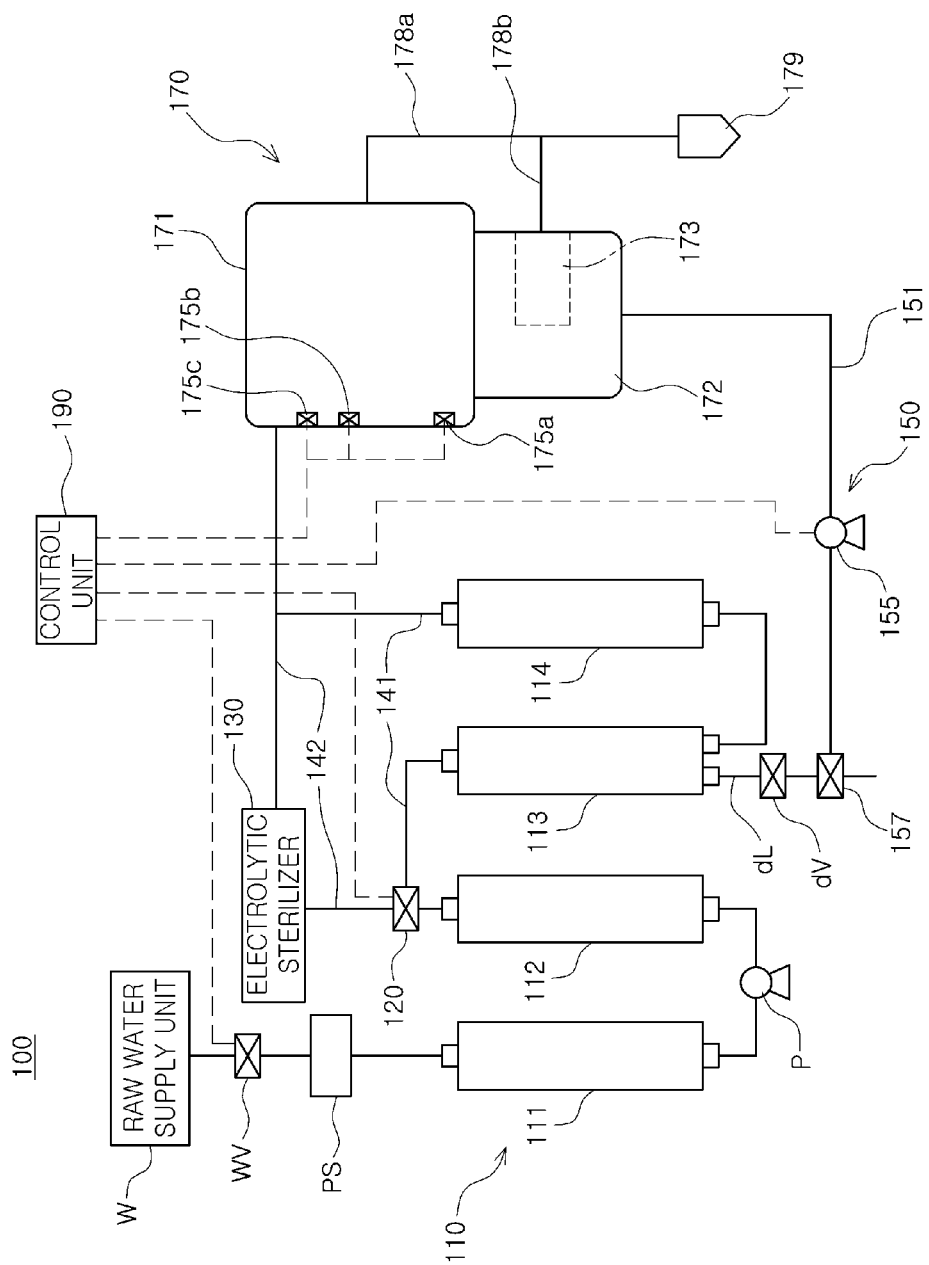

[Fig. 3]
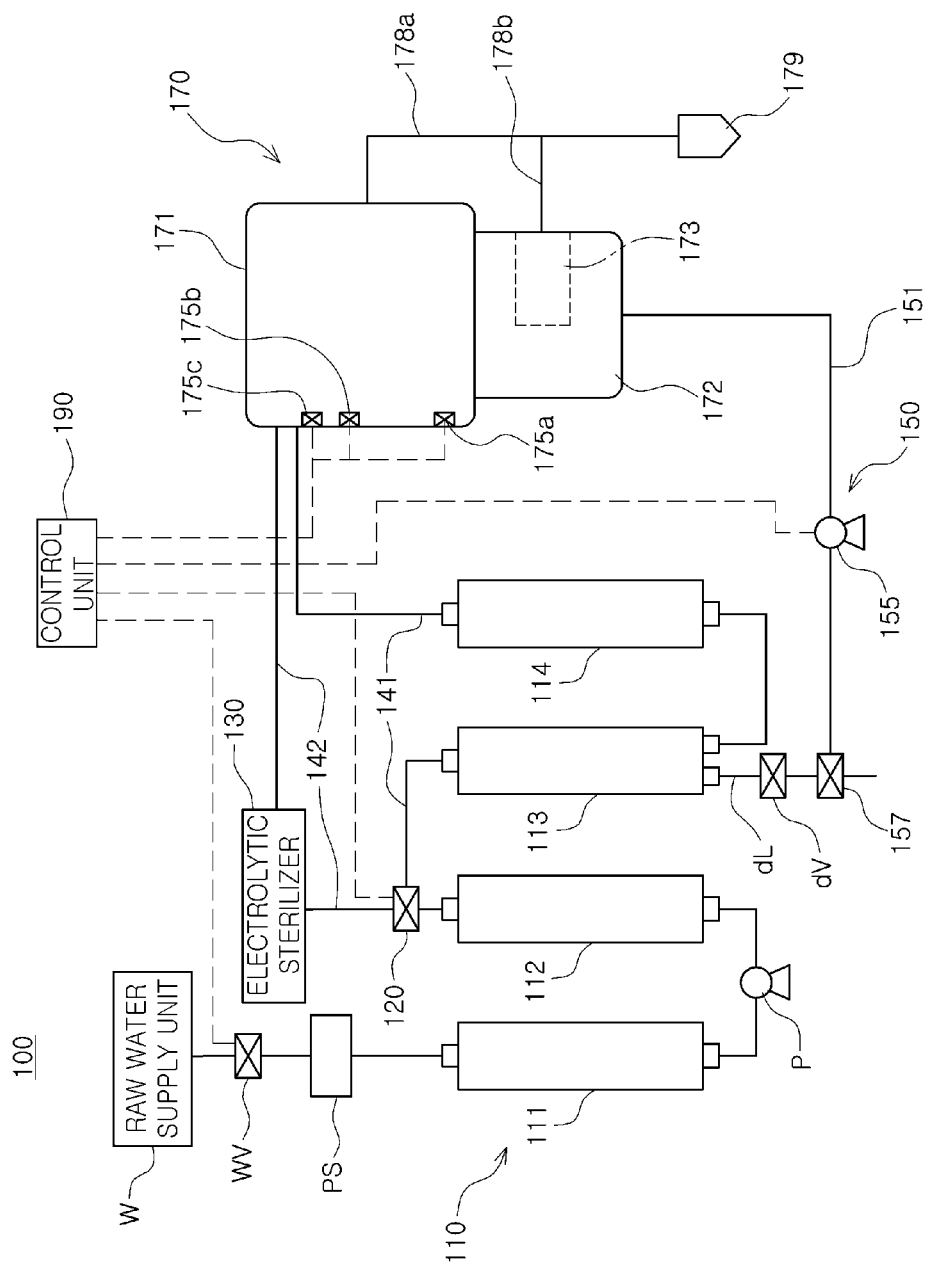

[Fig. 4]
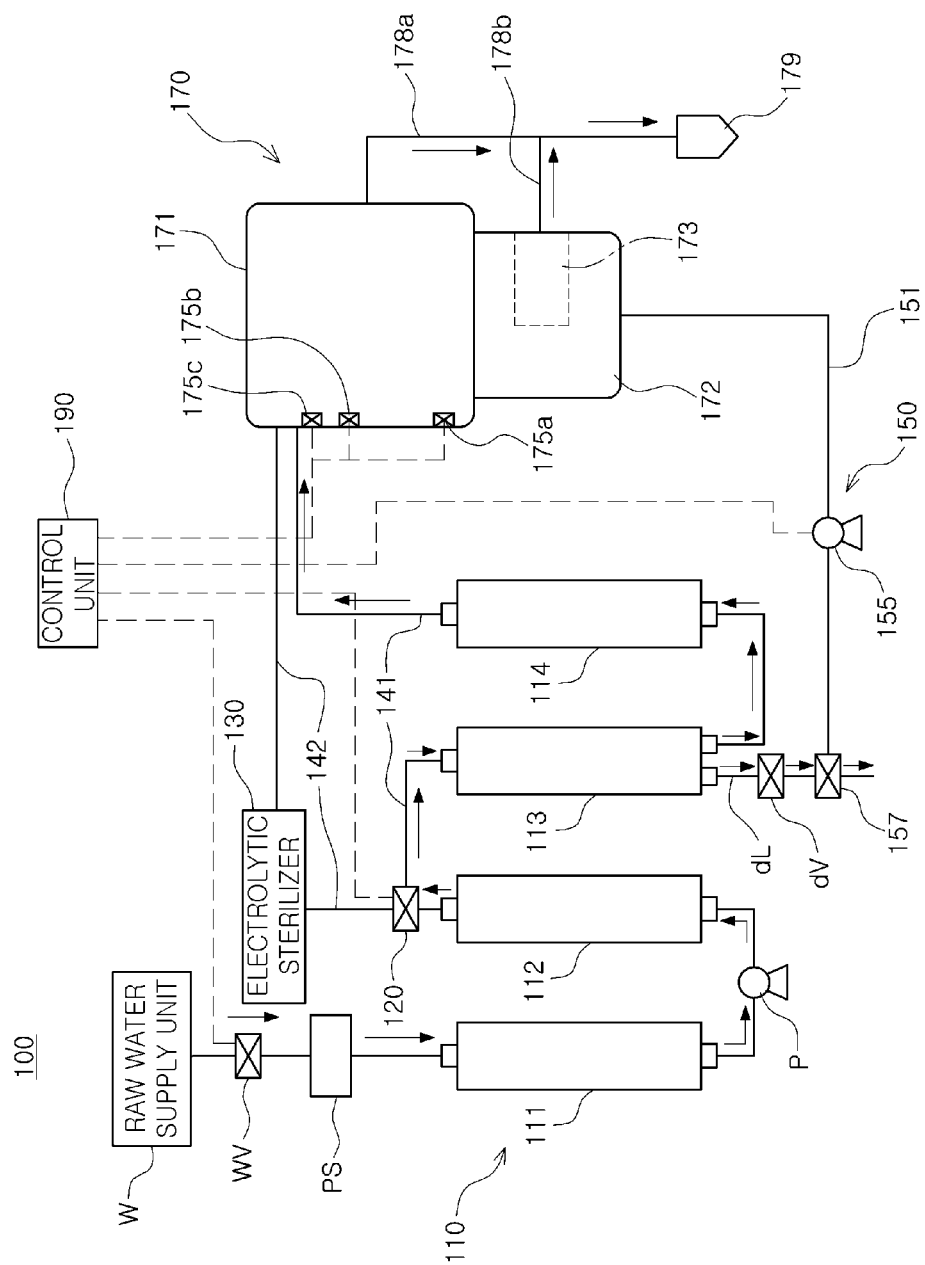

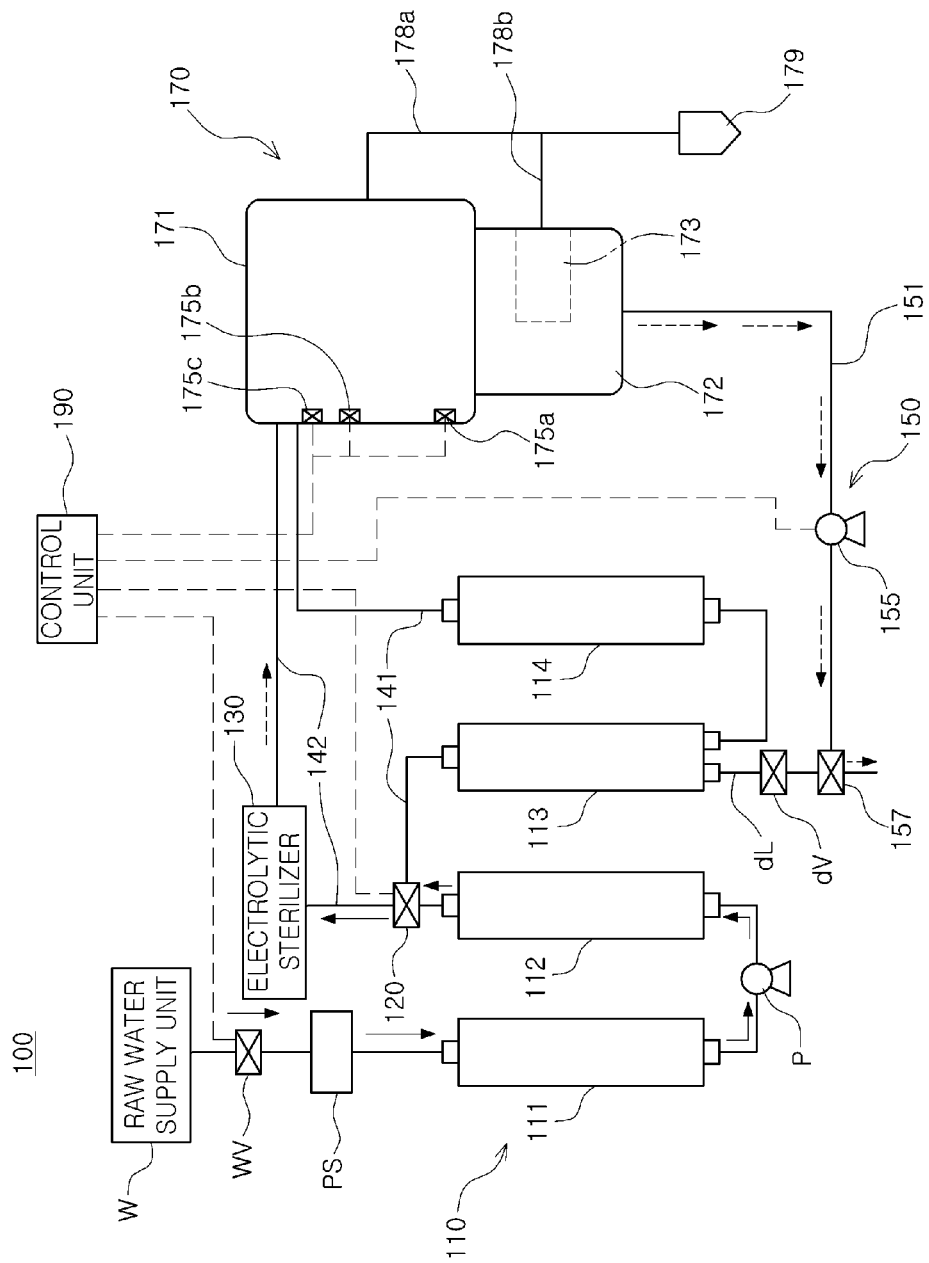
[Fig. 5]

[Fig. 6]
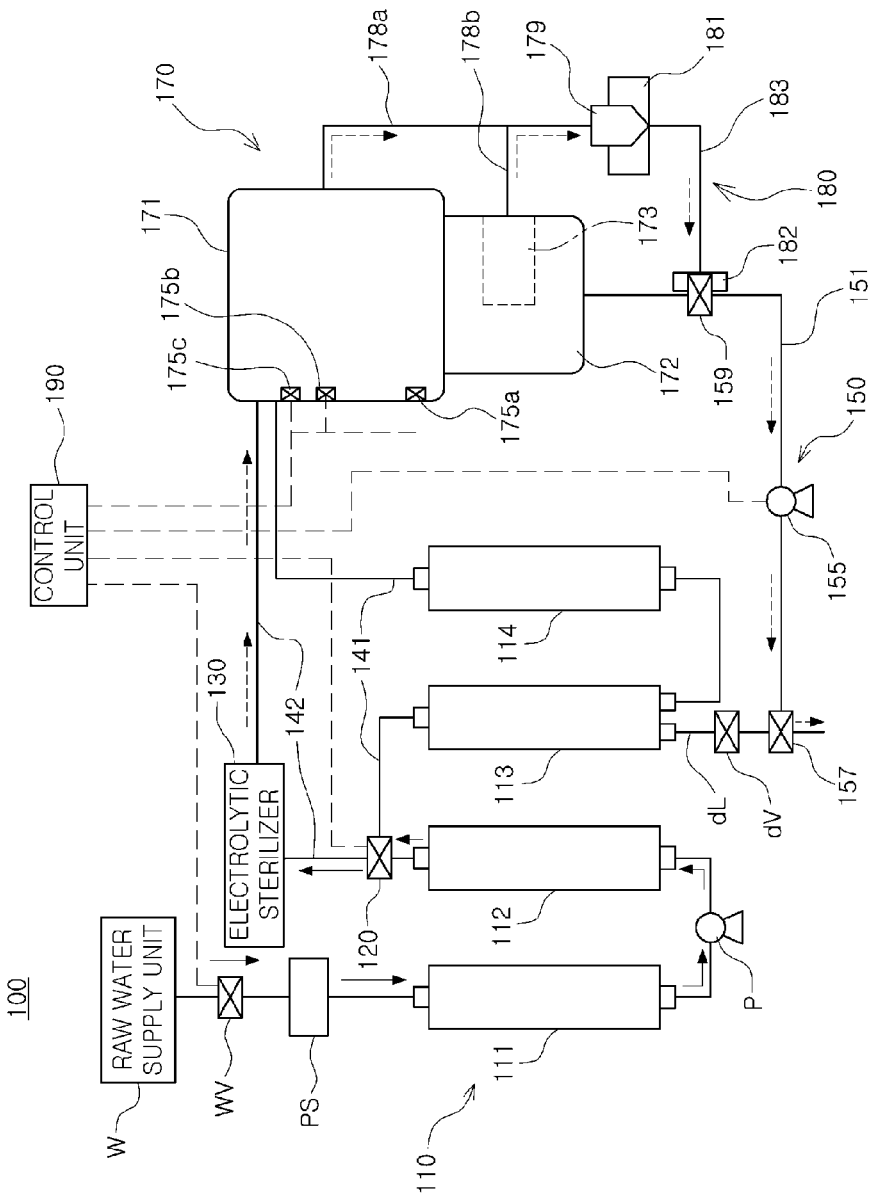
[Fig. 7]
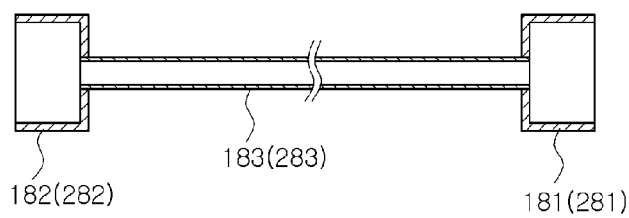

[Fig. 8]
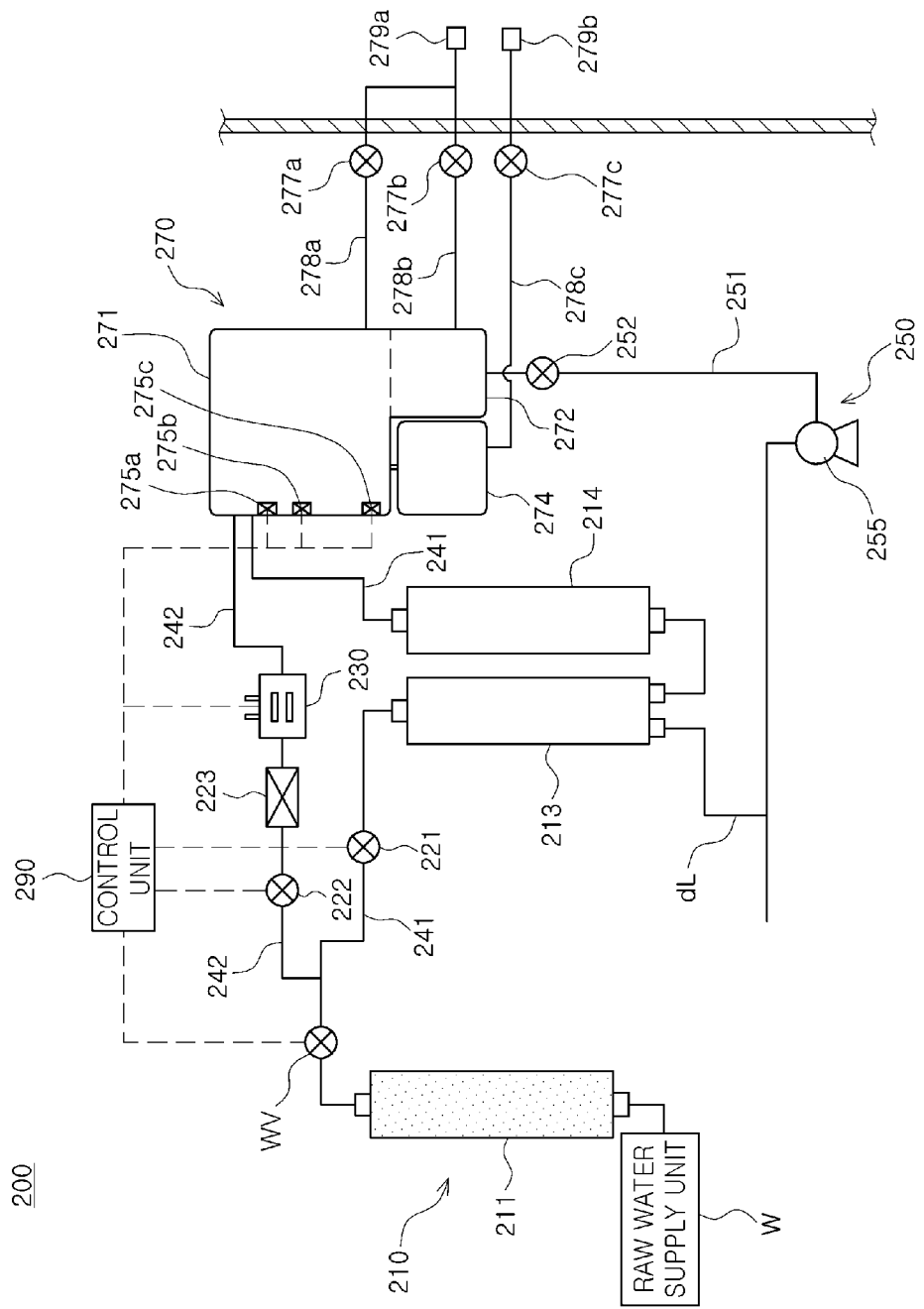

[Fig. 9]
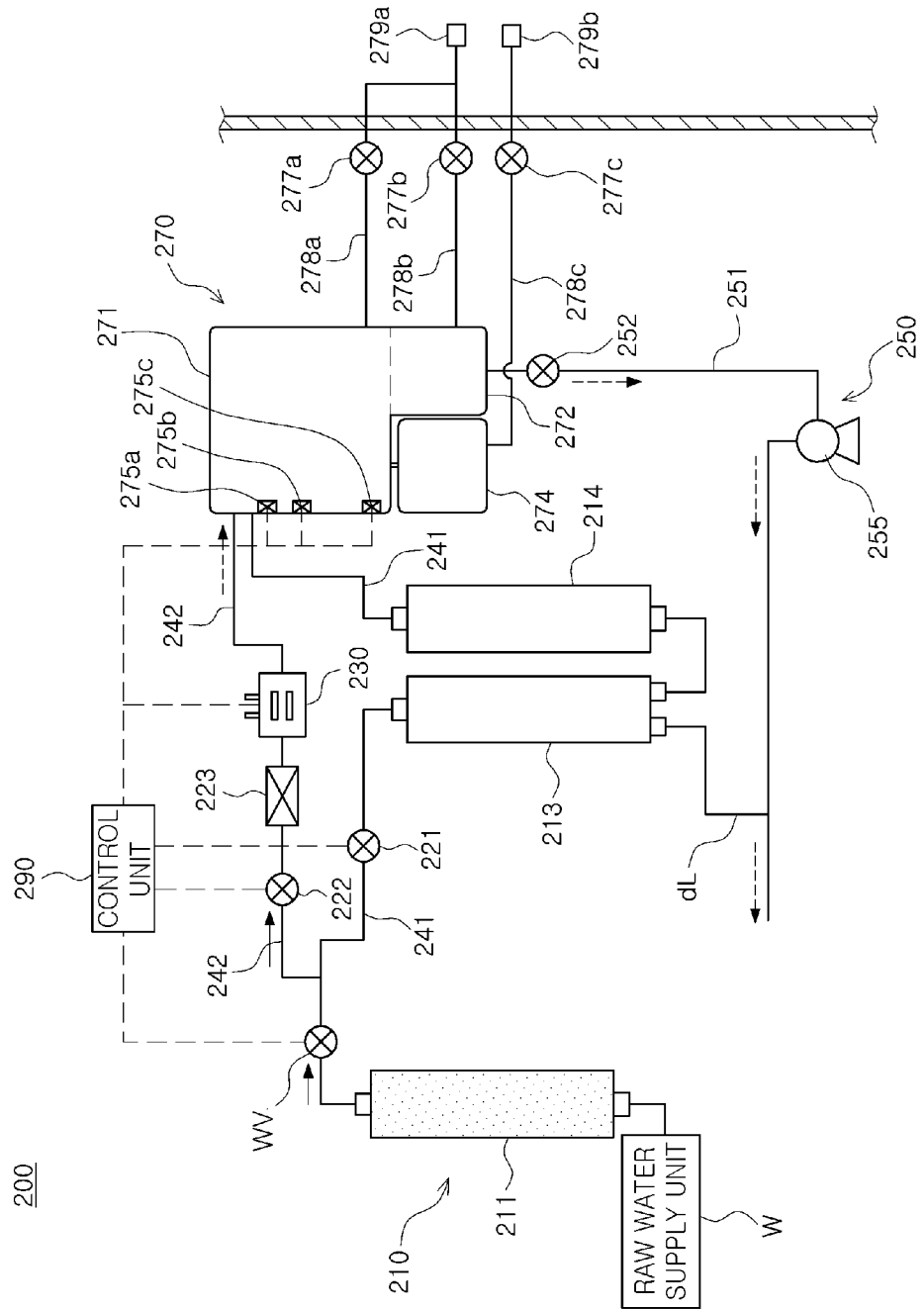

[Fig. 10]
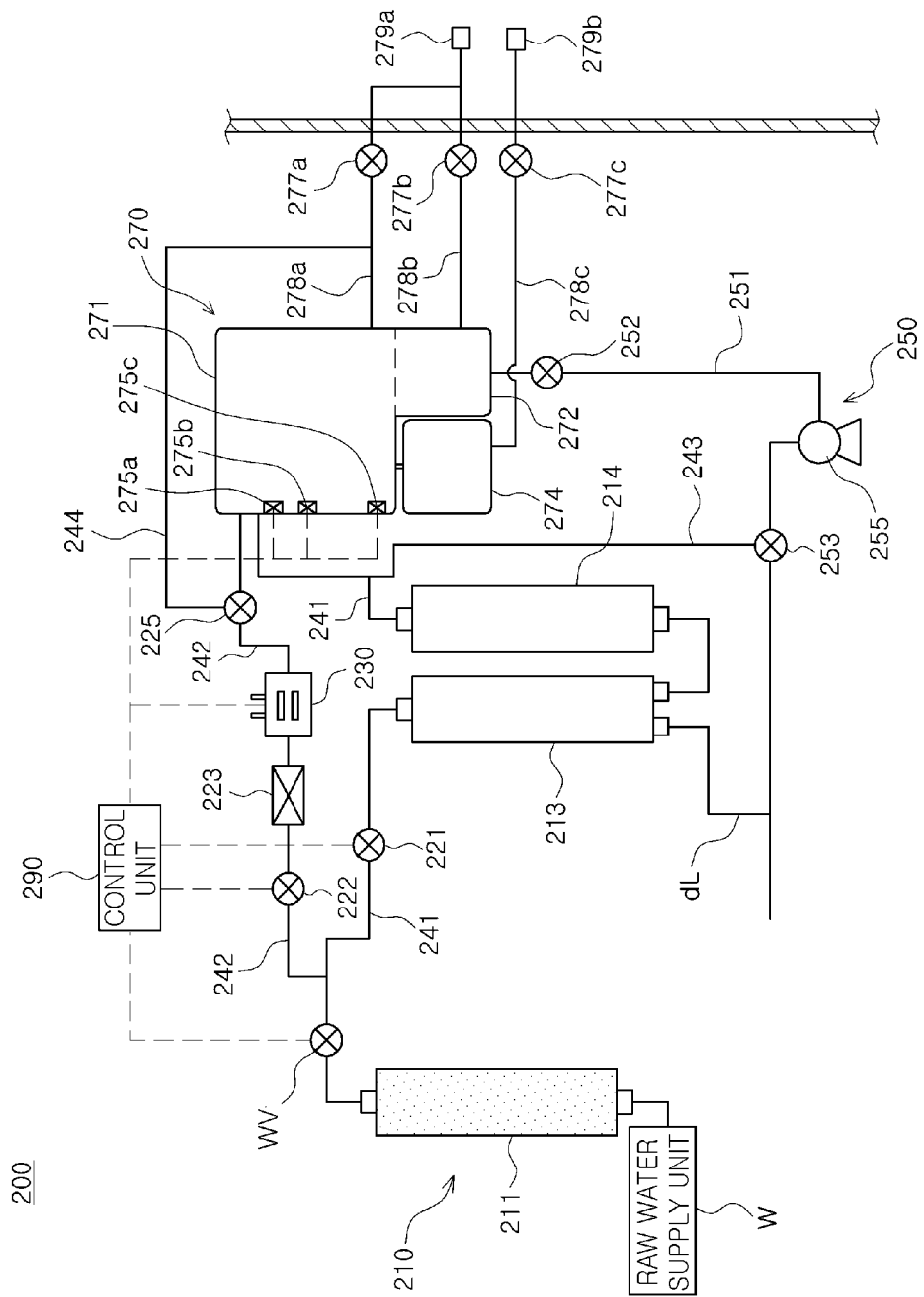

[Fig. 11]
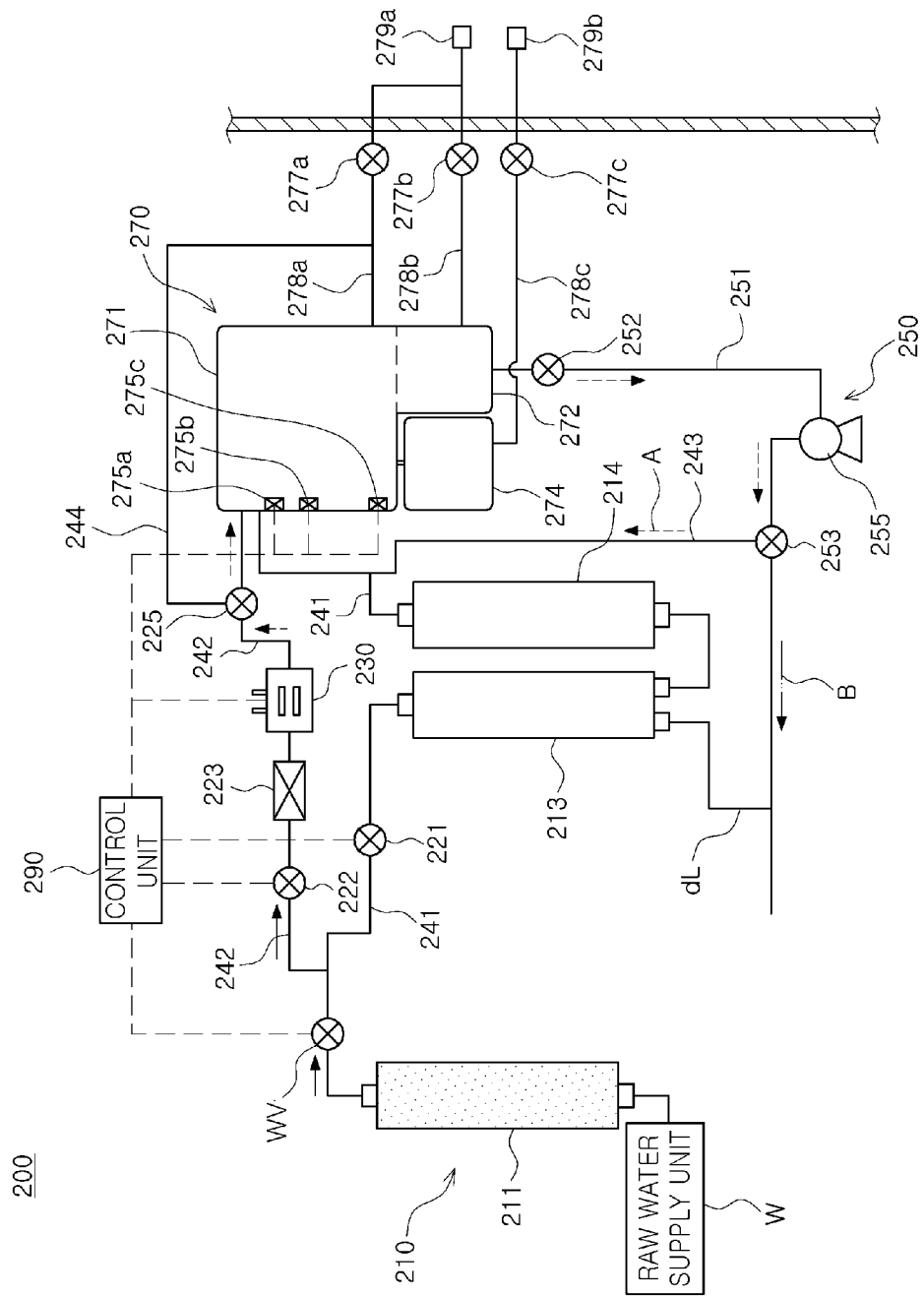

[Fig. 12]
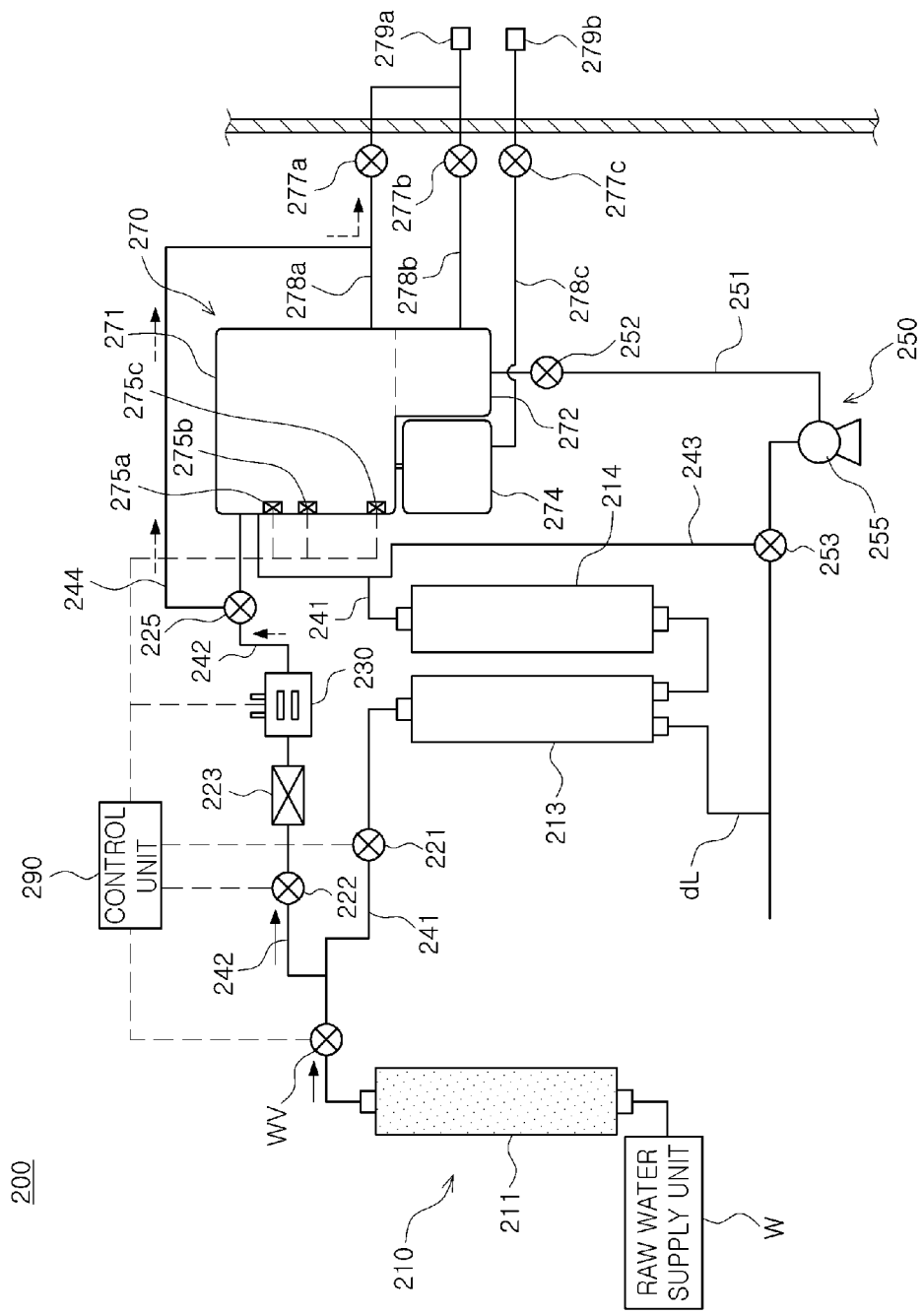

[Fig. 13]
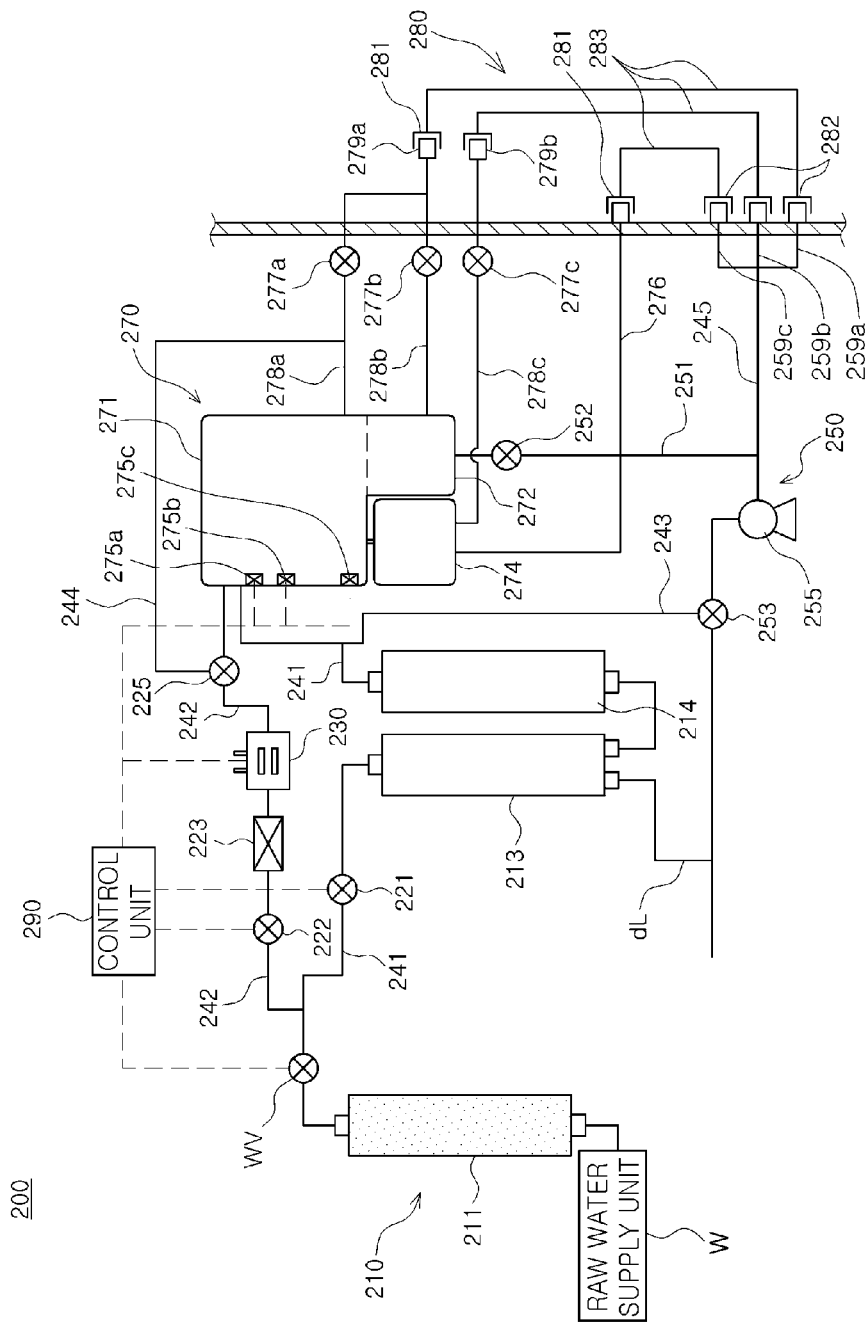

[Fig. 14]
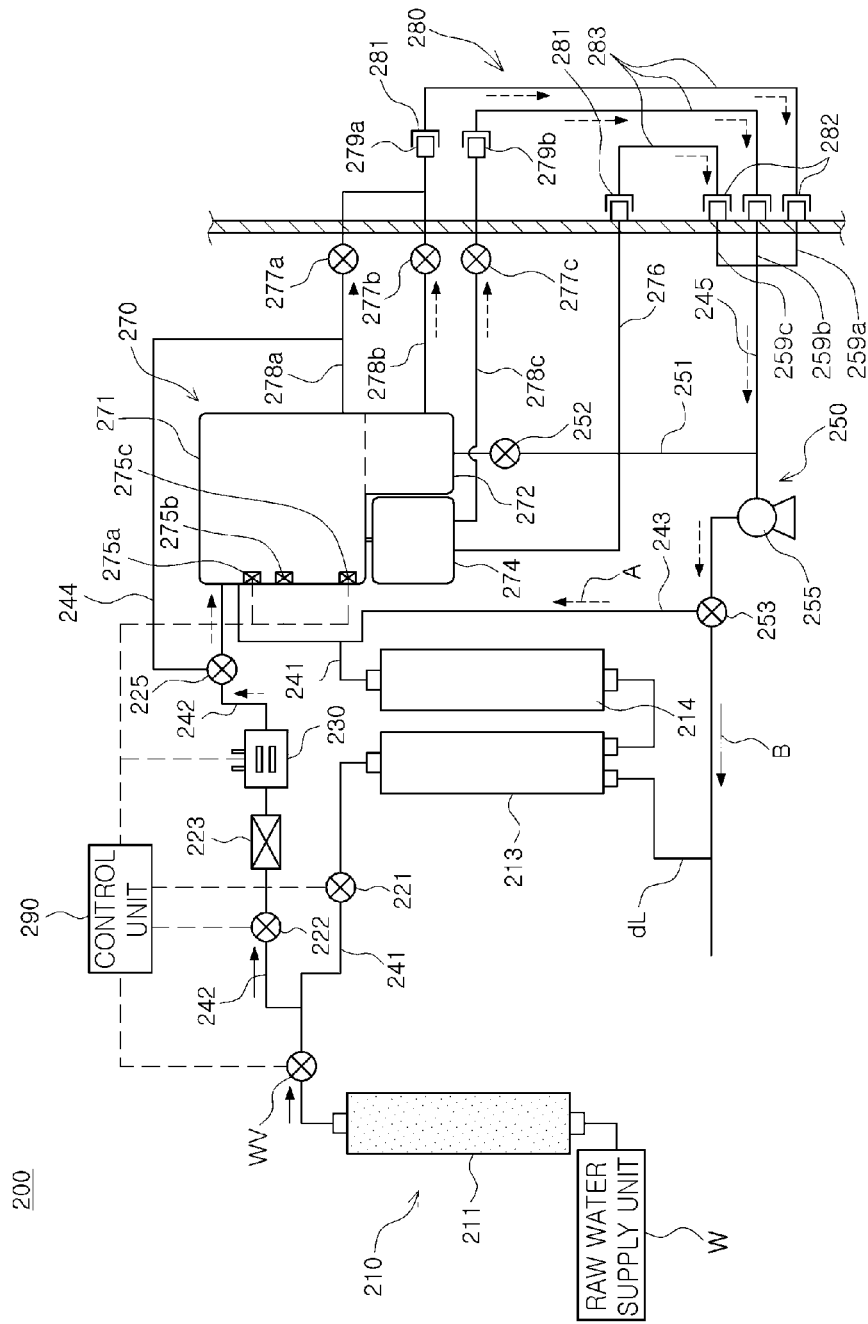

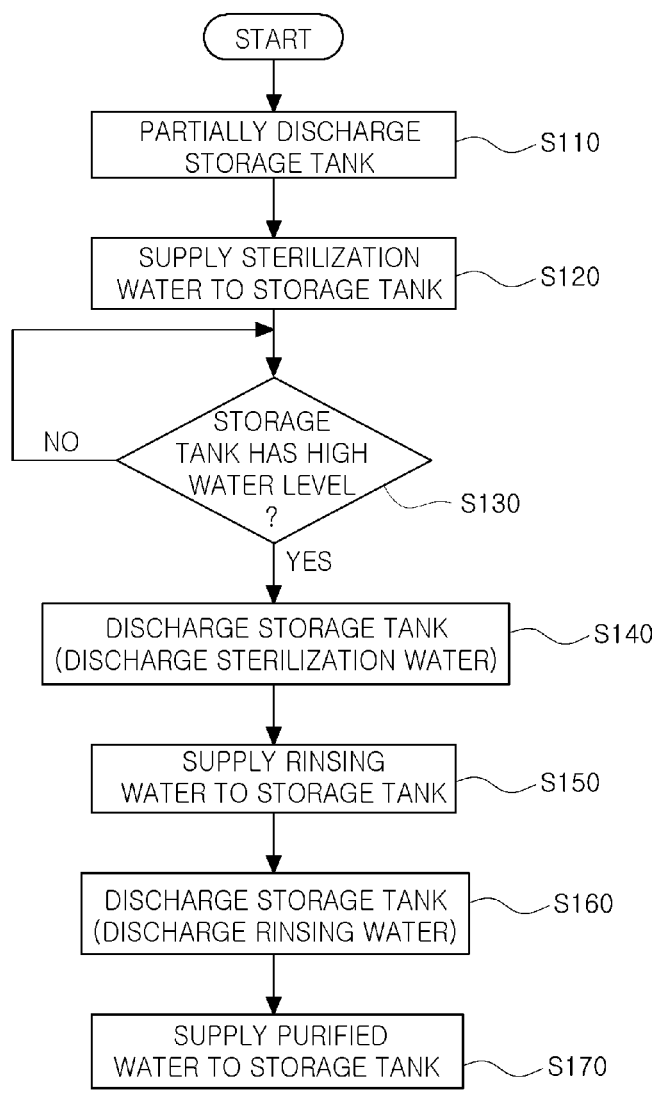

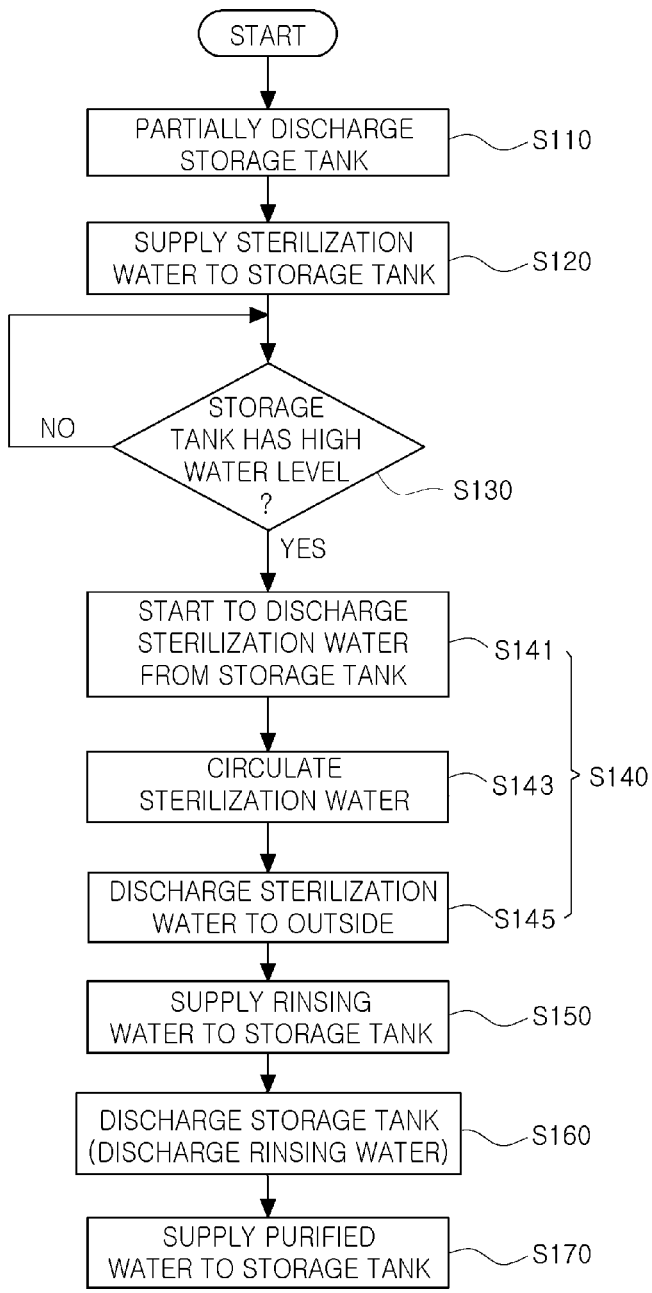

WATER TREATMENT APPARATUS AND STERILIZING AND CLEANSING METHOD THEREOF

PRIORITY

This application is a National Phase Entry of PCT International Application No. PCT/KR2011/003722 filed May 19, 2011, and claims priority to Korean Patent Application Nos. 10-0046806, 10-2010-0137350, 10-2010-0138727 and 10-2011-0040152 filed with the Korean intellectual Property Office on May 19, 2010, Dec. 28, 2010, Dec. 30, 2010 and Apr. 28, 2011, respectively, the contents of each which is incorporated herein by reference.

TECHNICAL FIELD

The present invention relates to a water treatment apparatus capable of sterilizing a storage tank and a sterilizing and cleansing method thereof, and more particularly, to a water treatment apparatus capable of generating sterilization water including a material having a sterilizing function through electrolysis and providing the generated sterilization water to a storage tank to thus sterilize the storage tank and a flow path connected to the storage tank, and a sterilizing and cleansing method thereof.

A water treatment apparatus may be used for various purposes such as processing wastewater or tap water, producing ultra-pure water, or the like, and the present invention particularly relates to a water treatment apparatus used for the purpose of drinking. The water treatment apparatus for the purpose of drinking receives raw water (i.e., tap water) and filters it to produce clean water, so it is also generally called a water purifier in a narrow sense. Such a water purifier is configured to receive raw water (or tap water), filter it by means of a filtration unit, and provide clean water (or purified water) at room temperature to a user. The water purifier may also be configured to heat or cool purified water at room temperature to provide warm and/or cold water to the user.

Among water treatment apparatuses for the purpose of drinking there is a functional water purifier that provides various types of functional water such as ionized water, carbonated water, and oxygenized water. Additionally, the water treatment apparatus may include a water heater, a water cooler, an ice maker, and the like, which heats or cools water supplied from a water container, or the like, or generates ice by using the supplied water. In the present disclosure, the water treatment apparatus is used to generally refer to a water purifier, a water heater, a water cooler, an ice maker, as mentioned, and a device having multiple functions using these devices. The water purifier may be taken as an example for the sake of brevity, but such a water purifier should be understood as being an example of the water treatment apparatus according to an exemplary embodiment of the present invention.

BACKGROUND ART

In general, water purifiers are classified into a hollow fiber membrane type water purifier and a reverse osmosis membrane type water purifier according to a water purification method employed therein.

Among them, the reverse osmosis (RO) membrane type water purifier has been known to be superior to other types of water purifying methods developed to date in terms of removing contaminants.

The reverse osmosis membrane type water purifier may be configured to include a sediment filter, a fine 5 micron filter, for removing dust, residue (or dregs), various floating matter from raw water supplied from a faucet, or the like, a pre-carbon filter for removing chemical substances, such as carcinogens (or a cancer causing agents), synthetic detergents, insecticides, or the like, harmful to a human body, residual chlorine, and the like, by using an active carbon absorption method, an RO membrane filter configured as an 0.001 micron RO membrane to filter sodium, various germs, and the like, as well as heavy metals such as lead, arsenic (As), and the like, and discharging condensed water through a drain pipe, and a post-carbon filter for removing an unpleasant taste or smell, a coloring matter, or the like, included in water which has passed through the RO membrane filter.

The hollow fiber membrane type water purifier employs a hollow fiber membrane filter (ultrafiltration filter (UF)) instead of the RO membrane filter. The hollow fiber membrane filter, a porous filter with pores, tens to hundreds of nanometers (nm) in size, removes contaminants from water through numerous fine pores distributed on the membrane surface.

The RO membrane type water purifier or the hollow fiber membrane type water purifier may use the four filters as mentioned above, may further include an antifungal filter or a functional filter in addition, or may include a complex filter configured to have the multiple functions of various filters. For example, the functions of the sediment filter and the pre-carbon filter may be implemented in a single complex filter.

However, in the water purifier, the post-carbon filter, or the like, may be easily contaminated by germs and since germs may thereby be introduced into the storage tank, microbes (or microorganisms) may grow in the storage tank. In addition, germs or microbes may infiltrate into and propagate in purified water stored in the storage tank or algae (or slime) may be formed on an inner wall of the storage tank.

Thus, in order to sterilize the germs or microbes to keep them from growing or propagating in the storage tank, a technique of supplying sterilization chemicals from the outside to sterilize the storage tank and a discharge flow path of purified water has been proposed.

However, the sterilization chemicals supply method is disadvantageous in that a user or a water purifier manager must carry out a sterilization chemicals supply operation, such that the sterilization operation may be cumbersome and sterilization management ineffective. Namely, when the sterilization chemicals are applied, an automatic supply of the sterilization chemicals is impossible, and if ever, the sterilization chemicals must be periodically applied, making the operation cumbersome.

In addition, when the sterilization chemicals are applied, the concentration of the sterilization chemicals may be higher than necessary, according to circumstances, and the sterilization chemicals may be applied in smaller or larger amounts, according to the user or the manager, leading to a possibility in which the sterilization chemicals remain in the interior of the water purifier after a cleansing operation (or washing operation). Thus, a rinsing operation must necessarily be performed several times after the cleansing operation, and in this case, if the rinsing operation is not perfect, supplied water might be harmful to a human body and the smell of remaining sterilization chemicals could increase user dissatisfaction.

In addition, since the water purifier manager must perform the sterilization chemical supply operation, incurring costs for sterilization, the user may feel burdened by the cost for the service.

In particular, in most cases, the water purifier is cleansed by a service superintendent, rather than being sterilized and cleansed by itself, inevitably making the operation onerous, which leads to a degradation of the water purifier.

Also, the conditions for dissolving or eluting the sterilization chemicals differ according to water purifier operation conditions (e.g., raw water pressure, flow rate, etc.). For example, when the flow rate is low, sterilization density may relatively increase, and when the flow rate is high, sterilization density may decrease, causing difficulty in controlling sterilization. Thus, if the density of the sterilization chemicals is high, the purified water will possibly smell bad.

In addition, the sterilization material generated by the sterilization chemicals is mainly an OCl$^-$ material having either a very low or very high pH, emitting an offensive odor, and since the sterilization performance of the sterilization material is merely about 1/70 that of HOCl, a larger amount of sterilization material is required to sterilize a tank having the same capacity. Thus, sterilization efficiency is drastically degraded as compared with a case in which a sterilization material is formed of a mixed oxide including the HOCl material as a main ingredient by using an electrolytic cell (to be described).

Thus, in an effort to solve the problem of the water purifier sterilized by using the sterilization chemicals, a method for automatically sterilizing the storage tank by using an electrolytic cell has been proposed. FIG. 1 illustrates a water treatment apparatus disclosed in Korean Laid Open Publication No. 2009-0128785.

As shown in FIG. 1, the related art water treatment apparatus 10 filters raw water supplied from a raw water supply unit such as a waterworks (or a water supply system) 15 by means of a water purification filter 14 and stores it in a water tank 13. When the user requests water, the related art water treatment apparatus 10 supplies purified water through a dispenser 17. Here, when it is detected that the purified water accommodated or housed in the interior of the water tank 13 has been contaminated by a contamination level sensor 13a provided in the water tank 13, or when a certain period of time has elapsed, hypochlorous acid is generated by using a chloride supply device 11 and an electrolysis device 12 and supplied to the water tank 13. A cleansing operation of the water tank 13 disclosed in the publication will now be described in detail.

First, when it is detected that the water tank 13 is required to be cleansed by the contamination level sensor 13a, or the like, water accommodated in the water tank 13 is completely drained (or water is mostly drained to have a low level or to be close to the bottom of the water tank 13) by using an extraction pipe (G) and a dispenser 17 or through a drain pipe (F) to sewage 16. When the drainage of water accommodated in the water tank 13 is terminated, a valve (Vg or Vf) is shut off. The chloride supply device 11 supplies chloride such as sodium chloride (NaCl), potassium chloride (KCl), or the like, to the electrolysis device 12, and in order to generate a chloride aqueous solution, raw water (tap water), which has not passed through the water purification filter 14, may be supplied through a raw water supply pipe (B), or purified water which has been filtered by the water purification filter 14 may be supplied through a purified water supply pipe (C) at a rear stage of the water purification filter 14. In this case, after the chloride and raw water (tap water) or purified water is supplied to the interior of the electrolysis device 12, power is applied to an electrode 12a of the electrolysis device 12 after a lapse of a time sufficient for dissolving the chloride, to produce an aqueous solution including hypochlorous acid through electrolysis (an oxidation-reduction reaction) of the chloride aqueous solution. The water tank 13 is filled with the hypochlorous acid aqueous solution produced thereby, until such time as the water tank 13 has a high water level, and this state is maintained for a certain period of time required for sufficiently sterilizing and cleansing the water tank 13. When a certain period of time has lapsed, the hypochlorous acid aqueous solution is discharged to the outside of the water tank 13. In this case, in order to remove the hypochlorous acid aqueous solution, water, which has passed through the water purification filter 14, is supplied to the water tank 13 through the purified water supply pipe (D) or tap water, which has not passed through the water purification filter 14, is supplied to the water tank 13 through a rinsing pipe (H) until such time as the water tank has a high water level, and thereafter, when a certain period of time has lapsed, the rinsing water accommodated in the water tank 13 is drained. These operations are performed several times to complete the cleansing operation of the water tank 13. Thereafter, raw water is filtered through the water purification filter 14 and the purified water is supplied to the water tank 13 so as to be supplied to a user.

However, the related art water treatment apparatus 10 having the foregoing configuration has the following problems.

First, since sterilization water such as the hypochlorous acid aqueous solution is required to be generated to sterilize and cleanse the water tank 13, the chloride supply device 11 is a requisite.

Namely, the related art water treatment device supplies chloride in the form of sodium chloride (NaCl), potassium chloride (KCl), or the like, to the electrolysis device 12 through the chloride supply device 11, and the electrolysis device 12 electrolyzes the chloride aqueous solution to generate the hypochlorous acid aqueous solution.

However, the supply of the chloride to the electrolysis device 12 requires time for the chloride to be completely, or at least mostly, dissolved to generate the chloride aqueous solution, lengthening the cleansing time, and in this case, if a time for dissolving the chloride is intended to be reduced, a stirrer is required.

In addition, a space for installing the chloride supply device 11 is required, and in order to supply a certain amount of chloride to the electrolysis device 12, the structure and controlling of the chloride supply device 11 is complicated.

Second, since the hypochlorous acid aqueous solution is generated through the chloride supply device 11 and the electrolysis device 12, the hypochlorous acid aqueous solution having strong sterilizing power and a strong smell must be completely (or at least mostly) drained from the water tank 13 and a rinsing operation is required to be performed several times. In particular, since the hypochlorous acid aqueous solution having a strong smell may not be sufficiently removed through a single rinsing operation, the user may experience unpleasantness, and, since the rinsing operation must be performed several times, a great deal of time is required for the rinsing operation and a large quantity of water may be consumed.

Third, in the related art water treatment apparatus 10, when raw water (tap water) is supplied through the raw water supply pipe (B), without passing through the water purification filter 14, to the electrolysis device 12, the life span and performance of the electrode are drastically degraded.

Namely, when unfiltered raw water (tap water) is supplied to the electrolysis device 12, various foreign materials are supplied to the electrolysis device 12 to shorten the life span of the electrode 12a, reduce the area in which the electrolysis reaction occurs, generating air or an overcurrent, or the like.

Meanwhile, in the related art water treatment apparatus 10, when water, which has passed through the water purification filter 14, is supplied to the electrolysis device 12 through the purified water supply pipe (C), the amount of total dissolved solids (TDS) may be significantly reduced and fail to supply a sufficient amount of electrolytes to the electrolysis device 12, and thus, without the chloride supply device 11, a mixed oxidant (MO) (a sterilizing material) having a certain concentration or higher required for exhibiting the sterilizing performance cannot be generated. Namely, as mentioned above, the water purification filter 14 includes a plurality of filters such as the RO membrane filter, so when water passes through all of the filters, such as the RO membrane filter, the amount of TDS is considerably reduced, failing to generate the mixed oxidant required for implementing the sterilizing performance with only the purified water.

Also, in the related art water treatment apparatus 10 illustrated in FIG. 1, water, which has passed through the water purification filter 14, moves to the water tank 13 or the electrolysis device 12. Thus, in this related art, the flow path is merely changed to allow water, which is to flow to the water tank 13, to flow to the electrolysis device 12 (namely, the flow path (C) is diverged from the flow path (D), so the flow rate of water introduced to the electrolysis device 12 cannot be controlled. Namely, in the related art, the flow rate cannot be controlled over the electrolysis device 12, causing a problem in which the concentration (or density) of the sterilizing material generated in the electrolysis device 12 is not uniform.

Fourth, in the related art water treatment apparatus 10, purified water accommodated in the water tank 13 is completely (or at least mostly, to have a low water level or to be close to the bottom) drained before the hypochlorous acid aqueous solution is supplied to the water tank 13 to cleanse the water tank 13, and to this end, excessive time may be required to drain water and a large amount of water may be wasted (i.e., water wastage is severe).

In particular, in the related art water treatment apparatus 10, the large capacity water tank 13 is completely (or mostly) emptied and the interior of the water tank 13 is filled with the hypochlorous acid aqueous solution, an operation time of the electrolysis device 12 for supplying the hypochlorous acid aqueous solution is lengthened, consuming excessive power, shortening the life span of the electrode 12a, and requiring a lengthy period of time to supply the hypochlorous acid aqueous solution.

Fifth, in the related art water treatment apparatus 10, natural drainage is employed to empty the water tank 13 in the draining operation before the hypochlorous acid aqueous solution is supplied, in the draining operation of the hypochlorous acid aqueous solution, and in the draining operation of a rinsing solution. This requires a large amount of time for drainage, and as a result, a relatively large amount of time is required to sterilize and cleanse the water tank 13.

In particular, as mentioned above, the requirement of a lot of time for sterilizing and cleansing the water tank is quite burdensome to the user or the water purifier manager, and although the sterilizing and cleansing processes are performed at nighttime when a user does not frequently use the water purifier, a user cannot use the water purifier while the water tank is being sterilized and cleansed and noise generated by the sterilizing and cleansing operation is maintained for a long period of time, causing user inconvenience.

Sixth, in the related art water treatment apparatus 10 illustrated in FIG. 1, a dispenser (cock) 17 can be sterilized and cleansed by discharging the hypochlorous acid aqueous solution through the dispenser (cock) 17. In this case, however, a waterspout member is required to receive the discharged sterilizing and washing water. In particular, considering that the water tank 13 has a large capacity, there is a limitation in automatic drainage.

DISCLOSURE OF INVENTION

Technical Problem

An aspect of the present invention provides a water treatment apparatus capable of stably performing sterilization and cleansing by using only purified water filtered through a filter unit without the application of sterilization chemicals or without using chloride, and a sterilizing and cleansing method thereof.

Another aspect of the present invention provides a water treatment apparatus capable of lengthening the life span of an electrode by driving a sterilizer at a low current and with low power to generate a sterilizing material, and a sterilizing and cleansing method thereof.

Another aspect of the present invention provides a water treatment apparatus capable of sterilizing a water intake cock or a water purification line at a front stage of a storage tank, as well as the storage tank, and a sterilizing and cleansing method thereof. In particular, the water cock can be easily and automatically sterilized through a simple operation according to the water treatment apparatus and the sterilizing and cleansing (or washing) method thereof.

Another aspect of the present invention provides a water treatment apparatus capable of minimizing time required for performing a sterilizing and cleansing operation, and a sterilizing and cleansing method thereof.

Another aspect of the present invention provides a water treatment apparatus capable of enhancing durability and a life span of an electrolytic sterilizer, and a sterilizing and cleansing method thereof.

Another aspect of the present invention provides a water treatment apparatus capable of automatically sterilizing a storage space and a discharge flow path of purified water according to a pre-set time or a user's selection, and a sterilizing and cleansing method thereof.

Solution to Problem

According to an aspect of the present invention, there is provided a water treatment apparatus including: a filter unit purifying raw water; a storage tank connected to the filter unit and storing purified water which has been filtered through the filter unit; an electrolytic sterilizer installed between the filter unit and the storage tank, electrolyzing only purified water which has been filtered through at least a portion of the filter unit to generate sterilization water, and supplying the sterilization water to the storage tank; a drain unit connected to the storage tank and discharging water accommodated in the storage tank; and a control unit controlling a water purification mode of the filter unit and a sterilization mode through the electrolytic sterilizer and the drain unit.

The electrolytic sterilizer may generate sterilization water including a mixed oxidant (MO) through electrolysis.

In the sterilization mode, the control unit may operate the electrolytic sterilizer to generate sterilization water and discharge the sterilization water stored in the storage tank through the drain unit.

The filter unit may include a reverse osmosis (RO) membrane filter, and the electrolytic sterilizer may be installed in a sterilization water line between a front stage of the RO membrane filter and the storage tank. The filter unit may include a sediment filter, a pre-carbon filter, and an RO membrane filter sequentially connected through a water purification line, and the electrolytic sterilizer may be installed in the sterilization water line diverged from a flow path between the sediment filter and the RO membrane filter and connected to the storage tank. In this case, the sediment filter and the pre-carbon filter may be configured as a pre-processing complex filter. A pressure pump may be installed in a flow path between the sediment filter and the pre-carbon filter and a flow path between the pre-carbon filter and the RO membrane filter in order to provide pressure to raw water introduced to the RO membrane filter. A flow path changing valve may be provided in a portion at which the flow path between the sediment filter and the RO membrane filter and the sterilization water line are connected.

The filter unit may include a hollow fiber membrane filter, and the electrolytic sterilizer may be installed in the sterilization water line between a front stage of the hollow fiber membrane filter and the storage tank. The filter unit may include a sediment filter, a pre-carbon filter, and the hollow fiber membrane filter sequentially connected through a water purification line, and the electrolytic sterilizer may be installed in the sterilization water line diverged from a flow path between the sediment filter and the hollow fiber membrane filter and connected to the storage tank.

The electrolytic sterilizer may be detachably provided. A constant flow control valve may be installed in a front stage of the electrolytic sterilizer in order to make a flow rate (or flux) of water introduced to the electrolytic sterilizer uniform, and the constant flow control valve may be detachably attached together with the electrolytic sterilizer.

The sediment filter and the pre-carbon filter may be configured as a preprocessing complex filter.

A raw water cutoff valve for selectively preventing the supply of raw water may be installed in the water purification line of the filter unit.

A first switching valve for preventing purified water which has been filtered by the sediment filter or the sediment filter and the pre-carbon filter from being introduced to the RO membrane filter or allowing it to be introduced to the RO membrane filter may be installed in the flow path between the sediment filter and the RO membrane filter, and a second switching valve for preventing purified water which has been filtered by the sediment filter or the sediment filter and the pre-carbon filter from being introduced to the electrolytic sterilizer or allowing it to be introduced to the electrolytic sterilizer may be installed in the sterilization water line.

A constant flow control valve may be installed in the front stage of the electrolytic sterilizer in order to make a flow rate (or flux) of water introduced to the electrolytic sterilizer uniform. The constant flow control valve may have a function of reducing the pressure of introduced water to a certain pressure or lower.

The sterilization water line may be configured as a flow path separate from a flow path connecting a final filter provided in the filter unit and the storage tank.

The drain unit may include a drain line for discharging water accommodated in the storage tank. The drain unit may further include a drain pump installed in the drain line. The drain unit may further include a drain valve for switching the drain line. A drain pipe for draining concentrated water generated in the course of filtering the raw water may be connected to the RO membrane filter, and the drain line may be connected to the drain pipe.

The storage tank may include a first storage unit storing purified water which has passed through the filter unit and connected to a first water intake line and a second storage unit storing the purified water supplied from the first storage unit by changing the temperature of the purified water and connected to a second water intake line, wherein the first and second water intake lines may be connected to the water intake cock. In the sterilization mode through the control unit, the sterilization water stored in the first and second storage units may be discharged through the water intake cock or discharged through the drain unit.

The water intake cock may be connected to the drain line of the drain unit through a connection member. In this case, the connection member may include a first connection cap detachable with respect to the water intake cock, a second connection cap detachable with respect to the drain unit, and a connection hose connecting the first and second connection caps. The second connection cap may be detachably provided with respect to a valve connector provided to the drain line of the drain unit.

A circulation line for re-supplying sterilization water drained through the drain line to the storage tank may be provided between the drain line and a purified water line connecting the filter unit and the storage tank or between the drain line and a purified water line provided in the interior of the filter unit.

A circulation of sterilization water through the circulation line may be performed by the pressure of the drain pump.

A sterilization water extraction line for discharging sterilization water generated by the electrolytic sterilizer to the outside, without passing through the storage tank, may be provided to a rear stage of the electrolytic sterilizer. In this case, a flow path changing valve may be installed at a diverging point of the sterilization water extraction line and the purified water line between the electrolytic sterilizer and the storage tank.

The storage tank may include a middle water level sensor for sensing a middle water level between a high water level and a low water level, and when the sterilization mode starts, the control unit may open the drain line connected to the storage tank to drain purified water accommodated in the storage tank until such time as the middle water level sensor cannot sense the purified water. In this case, the control unit may drive the drain pump provided to the drain unit in order to drain the purified water accommodated in the storage tank.

An electrode body of a positive electrode provided to the electrolytic sterilizer may be coated with ruthenium (Ru). In this case, the electrode body of the positive electrode and that of a negative electrode provided to the electrolytic sterilizer may be made of titanium (Ti).

The electrolytic sterilizer may include one positive electrode and two negative electrodes disposed at both sides of the positive electrode. In this case, the control unit may control driving of the electrolytic sterilizer such that a maximum voltage applied to the electrolytic sterilizer is 30 volts. Also, the control unit may control driving of the electrolytic sterilizer such that a maximum current applied to the electrolytic sterilizer is 0.5 A.

According to another aspect of the present invention, there is provided a sterilizing and cleansing method of a water treatment apparatus storing purified water, which has been filtered through a filter unit, in a storage tank, including: a purified water drain step of draining purified water accommodated in the storage tank; a sterilization water supply step of electrolyzing only purified water which has been filtered through at least a portion of the filter unit to generate sterilization water, and supplying the sterilization water to the storage tank; and a sterilization water discharge step of discharging the sterilization water accommodated in the storage tank from the storage tank.

The sterilization water generated in the sterilization water supply step may include a mixed oxidant (MO) generated through electrolysis.

The method may further include: a rinsing water supply step of supplying rinsing water to the storage tank after the sterilization water discharge step; and a rinsing water discharge step of discharging the rinsing water accommodated in the storage tank from the storage tank.

The purified water drain step and the sterilization water supply step may be simultaneously performed.

The purified water drain step may be performed until such time as a drain line connected to the storage tank is open for a certain period of time to discharge only a portion of the purified water accommodated in the storage tank, rather than discharging the entirety of the purified water, or until such time as a middle water level sensor installed in the storage tank senses a middle water level between a high water level and a low water level.

The filter unit may include a reverse osmosis (RO) membrane filter, and in the sterilization water supply step, only purified water which has passed through a filter provided at a front stage of the RO membrane filter may be electrolyzed to generate sterilization water. In detail, the filter unit may include a sediment filter, a pre-carbon filter, and an RO membrane filter, sequentially disposed from a raw water supply unit, and in the sterilization water supply step, only purified water, which has been filtered through the sediment filter or through the sediment filter and the pre-carbon filter, may be electrolyzed to generate the sterilization water. Here, the sediment filter and the pre-carbon filter may be configured as a pre-processing complex filter.

The filter unit may include a hollow fiber membrane filter, and in the sterilization water supply step, only purified water which has passed through a filter provided at a front stage of the hollow fiber membrane filter may be electrolyzed to generate the sterilization water. In detail, the filter unit may include a sediment filter, a pre-carbon filter, and the hollow fiber membrane filter, sequentially disposed from a raw water supply unit. In the sterilization water supply step, only purified water, which has been filtered through the sediment filter or through the sediment filter and the pre-carbon filter, may be electrolyzed to generate the sterilization water. Here, the sediment filter and the pre-carbon filter may be configured as a pre-processing complex filter.

The sterilization water supply step may include a step of connecting one side of the electrolytic sterilizer to a flow path provided to the filter unit and connecting the other side of the electrolytic sterilizer to a flow path between the filter unit and the storage tank or to the storage tank, before the step of generating the sterilization water through the electrolytic sterilizer. A constant flow control valve may be installed in a front stage of the electrolytic sterilizer in order to make a flow rate (or flux) of water introduced to the electrolytic sterilizer uniform, and the electrolytic sterilizer may be detachably attached together with the constant flow control valve.

The sterilization water supply step may be performed until such time as a water level of the storage tank is high.

In at least one of the purified water drain step and the sterilization water discharge step, water accommodated in the storage tank may be discharged by using a drain pump. In this case, the sterilization water discharge step may be performed until such time as the drain pump is overloaded as the drainage of the storage tank is terminated.

In the sterilization water discharge step, the sterilization water accommodated in the storage tank may be discharged through a water intake cock or through a drain unit connected to the storage tank.

The sterilization water discharged through the water intake cock may be discharged through a drain pipe connected to the filter unit.

In the rinsing water supply step, rinsing water may be supplied in a pre-set amount smaller than a high water capacity corresponding to a high water level of the storage tank to rinse a bottom surface of the storage tank. In this case, the filter unit may include an RO membrane filter, and in the rinsing water supply step, purified water, which has passed through a filter provided at a front stage of the RO membrane filter, may be supplied.

In the rinsing water discharge step, the rinsing water accommodated in the storage tank may be discharged to the outside by using a drain pump. In this case, the rinsing water discharge step may be performed until such time as the drain pump is overloaded as the drainage of the storage tank is terminated.

The sterilization water supply step may be performed as a certain flow rate of decompressed purified water is introduced to the electrolytic sterilizer.

The sterilization water discharge step may include: a discharge start step of discharging the sterilization water from the storage tank; a circulation sterilizing step of circulating the sterilization water discharged from the storage tank to a flow path provided in the interior of the water treatment apparatus; and an external discharge step of discharging the circulated sterilization water to the outside.

The circulation sterilizing step may be performed by re-supplying the sterilization water discharged from the storage tank to the storage tank In the discharge start step, the sterilization water accommodated in the storage tank may be discharged through the water intake cock, and in the circulation sterilizing step, the sterilization water discharged through the water intake cock may be re-supplied to the purified water line of the filter unit so as to be re-introduced into the storage tank.

The water intake cock may be connected to a valve connector provided to the drain line of the drain unit through a connection member, and the drain line may be connected to the purified water line through a circulation line.

An electrode body of a positive electrode provided to the electrolytic sterilizer may be coated with ruthenium (Ru). In this case, the electrode body of the positive electrode and that of a negative electrode provided to the electrolytic sterilizer may be made of titanium (Ti).

The electrolytic sterilizer may include one positive electrode and two negative electrodes disposed at both sides of the positive electrode. In this case, the control unit may control driving of the electrolytic sterilizer such that a maximum voltage applied to the electrolytic sterilizer is 30 volts. Also, the control unit may control driving of the electrolytic sterilizer such that a maximum current applied to the electrolytic sterilizer is 0.5 A.

Advantageous Effects of Invention

As set forth above, in the water treatment apparatus according to exemplary embodiments of the invention, unlike the related art water treatment apparatus which sterilizes a storage tank, or the like, by adding sterilization chemicals, or the like, through an offline service, sterilization water is generated at a pre-set time or according to a user's selection and then discharged in a state of being stored in the storage tank, whereby the storage tank and a discharge flow path of purified water can be automatically sterilized.

Thus, since sterilization is automatically performed at a pre-set time or according to a user's selection, the sterilization management of the water treatment apparatus (i.e., a water purifier) can be facilitated, the reliability of the apparatus can be improved, and the apparatus can have a comparative advantage in terms of competitiveness.

In addition, since purified water, which has only passed through a portion of the filter unit, without adding chloride for electrolysis, in particular, purified water, which has passed through a filter installed in a front stage of an RO membrane filter, is electrolyzed, the structure of the apparatus for sterilization and cleansing is simple, and shortcomings such as the necessity of a chloride dissolution time because of the use of the chloride, the generation of a toxic substance, or an increase in the time required for a rinsing operation can be resolved.

In addition, since purified water including a large amount of chloride ions and total dissolved solids (TDS) is introduced to the electrolytic sterilizer through a portion of the filter unit, sterilization water including a high concentration of a sterilizing material having a sterilizing function such as a mixed oxidant (MO), or the like, can be stably generated even without the supply of chloride (an electrolyte material). Besides, since sterilization water is generated only through purified water without supplying chloride thereto, a generation of a bad smell or gas can be minimized, and in the case that a user ingests it, it is harmless to the human body and there is no change in its taste.

Also, since the ruthenium (Ru)-coated electrode is used as a positive electrode and a negative titanium (Ti) electrode is used, and in this case, since two sheets of titanium negative electrodes and one sheet of ruthenium-coated positive electrode are used, a desired density of a sterilizing material can be obtained with a low current and low power consumption, without the addition of chloride. Also, since such an electrode configuration allows the electrodes to be driven with a low current, the life span of the electrodes can be lengthened.

In addition, the water intake cock or the purified water line can be sterilized. In addition, since the water intake cock and the drain line are connected by using a connection member, there is no need to use a waterspout member to sterilize the water intake cock.

BRIEF DESCRIPTION OF DRAWINGS

The above and other aspects, features and other advantages of the present invention will be more clearly understood from the following detailed description taken in conjunction with the accompanying drawings, in which:

FIG. 1 is a schematic block diagram of a related art water treatment apparatus;

FIG. 2 is a schematic block diagram of a water treatment apparatus according to an exemplary embodiment of the present invention;

FIG. 3 is a schematic block diagram of a water treatment apparatus according to another exemplary embodiment of the present invention;

FIG. 4 is a block diagram showing a flow path configuration of a water purification mode of the water treatment apparatus illustrated in FIG. 3;

FIG. 5 is a block diagram showing a flow path configuration of a sterilization mode of the water treatment apparatus illustrated in FIG. 3;

FIG. 6 is a schematic block diagram of a water treatment apparatus according to another exemplary embodiment of the present invention;

FIG. 7 is a sectional view showing a connection member provided in the water treatment apparatus according to an exemplary embodiment of the present invention;

FIG. 8 is a schematic block diagram of a water treatment apparatus according to another exemplary embodiment of the present invention;

FIG. 9 is a block diagram showing a flow path configuration of a sterilization mode of the water treatment apparatus illustrated in FIG. 8

FIG. 10 is a schematic block diagram of a water treatment apparatus according to another exemplary embodiment of the present invention;

FIG. 11 is a block diagram showing a flow path configuration of a circulative sterilization mode of the water treatment apparatus illustrated in FIG. 8

FIG. 12 is a block diagram showing a flow path configuration of a sterilization water extraction mode of the water treatment apparatus illustrated in FIG. 10

FIG. 13 is a schematic block diagram of a water treatment apparatus according to another exemplary embodiment of the present invention;

FIG. 14 is a block diagram showing a flow path configuration of a circulative sterilization mode of the water treatment apparatus illustrated in FIG. 13

FIG. 15 is a flow chart illustrating the process of a sterilizing and cleansing method according to an exemplary embodiment of the present invention; and FIG. 16 is a flow chart illustrating the process of a sterilizing and cleansing method according to an exemplary embodiment of the present invention

MODE FOR THE INVENTION

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

A water treatment apparatus according to an exemplary embodiment of the present invention is a water tank type water treatment apparatus (water purifier) which allows raw water as water purification target which is introduced through a raw water supply unit to be filtered through various filters, stores the purified water in a storage space, and discharges it to the outside.

The water treatment apparatus filters raw water such as tap water, natural water, or the like, through filters provided in a filter unit to remove particulate impurities, heavy metals, and other harmful substances included in the raw water.

The water treatment apparatus according to an exemplary embodiment of the present invention is configured to electrolyze (in the present disclosure, the term "electrolyzing" will be understood to include the meaning of 'an oxidation-reduction reaction') only purified water which has been filtered through at least a portion of a filter unit to generate sterilization water including a material, such as a mixed oxidant (MO), having a sterilization function, and supply the generated sterilization water to a storage tank so as to allow the sterilization water to be discharged, thereby sterilizing and cleansing the storage tank and a flow path through which the sterilization water flows. In particular, the water treatment apparatus according to an exemplary embodiment of the present invention generates sterilization water including a highly concentrated mixed oxidant, or the like, by electrolyzing only purified water without adding chloride by using a chloride supply device.

Namely, in the water treatment apparatus according to an exemplary embodiment of the present invention, sterilization water including a mixed oxidant, or the like, having sterilization characteristics is generated through electrolysis and supplied to the storage tank, in which the supplied sterilization water is mixed with purified water already stored (or kept) in the storage tank to become sterilization water having a concentration sufficient to have sterilization characteristics (e.g., a mixed oxidant of 0.05 ppm or greater). Thereafter, the sterilization water is automatically discharged to sterilize a storage space of the purified water and a discharge flow path.

Water treatment apparatuses according to various embodiments of the present invention will be described with reference to FIGS. 2 to 14.

[First and Second Embodiments]

First, water treatment apparatuses according to first and second embodiments of the present invention will be described with reference to FIGS. 2 to 5.

FIG. 2 is a schematic block diagram of a water treatment apparatus according to a first embodiment of the present invention. FIG. 3 is a schematic block diagram of a water treatment apparatus according to a second embodiment of the present invention. FIG. 4 is a block diagram showing a flow path configuration of a water purification mode of the water treatment apparatus illustrated in FIG. 3. FIG. 5 is a block diagram showing a flow path configuration of a sterilization mode of the water treatment apparatus illustrated in FIG. 3.

A water treatment apparatus 100 according to first and second embodiments of the present invention includes a filter unit 110, a storage tank 170, an electrolytic sterilizer 130, a drain unit 150, and a control unit 190. These elements are described as follows.

The water treatment apparatus 100 according to the first embodiment illustrated in FIG. 2 and the water treatment apparatus 100 according to the second embodiment illustrated in FIGS. 3 to 5 are different in that a purified water line 141 after a post-carbon filter 114 is connected to a sterilization water line 142 and then connected to the storage tank 170 in the first embodiment (See FIG. 2) and the purified water line 141 is directly connected to the storage tank 170 in the second embodiment (See FIG. 3). Thus, the first and second embodiments will be described together, hereinafter.

As shown in FIGS. 2 to 5, the filter unit 110 may include a sediment filter 111, a pre-carbon filter 112, a reverse osmosis (RO) membrane filter 113 (or a hollow fiber membrane filter), and a post-carbon filter 114 to sequentially filter and purify raw water, and here, the types, number, and order of the filters may be altered according to a filtering scheme of the water treatment apparatus (or a water purifier) or filtering performance required for the water treatment apparatus. For example, a hollow fiber membrane filter, instead of the RO membrane filter 113, may be provided. The hollow fiber membrane filter, a porous filter with pores, each tens to hundreds of nanometers (nm) in size, removes water contaminants through numerous fine pores distributed on the membrane surface.

The post-carbon filter 114 illustrated in FIGS. 2 to 5 may be omitted, and a micro-filter (MF) or any other functional filter may be provided instead or additionally.

Each of the filters 111 to 114 may include a filter case including a filter element and an external case receiving the filter case and may have a cartridge structure in which raw water introduced into the interior of the external case is filtered by the filter element within the filter case and then discharged to the outside of the external case.

However, in the present embodiment, the filters 111 to 114 of the filter unit 110 are not particularly limited to having an independent cartridge form, respectively, but may be configured as a complex filter having the functions of two or more filters. For example, the sediment filter 111 and the pre-carbon filter 112 may be configured as a single pre-processing complex filter (refer to 211 in FIG. 8).

Hereinafter, the case in which the filters 111 to 114 of the filter unit 110 are sequentially connected as independent cartridge structures as shown in FIGS. 2 to 5 will be described as an example, but, as mentioned above, the configuration of the filter unit 110 is not limited thereto.

The sediment filter 111 serves to receive raw water from a raw water supply unit (W) and adsorb the raw water to remove solid substances, such as floating matter, sand, or the like, having relatively large particle diameters, included in the raw water.

Here, a raw water cutoff valve VW for selectively cutting off raw water supplied from the raw water supply unit (W) may be installed in a front stage of the sediment filter 111, but the installation position of the raw water cutoff valve VW is not limited thereto so long as it can cut off the supply of raw water and, as shown in FIG. 8, the raw water cutoff valve WV may be installed in the middle of the filter unit.

The pre-carbon filter 112 serves to receive water, which has passed through the sediment filter 111, and remove chemical materials, such as volatile organic compounds, carcinogenic substances, synthetic detergents, insecticides, or the like, harmful to a human body, as well as a residual chlorine (e.g., HOCl or ClO) component included in the water through an active carbon absorption method.

The RO membrane filter 113 serves to receive the water, which has been filtered by the pre-carbon filter 112, and remove heavy metals and other metal ions and fine organic/inorganic substances such as germs included in the water through a membrane with fine pores.

A drain pipe dL for draining concentrated water, i.e., wastewater (which is also called "concentrate" in the art), generated in the course of filtering raw water is connected to the RO membrane filter 113, and a drain valve dV for adjusting a discharge amount of the concentrated water is installed in the drain pipe dL.

In the present embodiment, as stated above, a hollow fiber membrane filter, instead of the RO membrane filter 113, may be provided. The hollow fiber membrane filter, a porous filter with pores, tens to hundreds of nanometers (nm) in size, removes water contaminants through numerous fine pores distributed on the membrane surface.

The post-carbon filter 114 serves to adsorb raw water to remove an unpleasant taste, smell, coloring, or the like, from the water which has been filtered through the RO membrane filter 113, and the purified water which has been filtered through the post-carbon filter 114 is received by the storage tank 170 through a purified water line.

The filters 111 to 114 of the filter unit 110 have a general structure well known in the art and commonly employed in a general water treatment apparatus (i.e., a water purifier), so a detailed description of the configuration thereof will be omitted.

The RO membrane filter 113 of the filter unit 110 purifies water through its membrane with fine pores, so the filter unit 110 may include a pressure pump (P) for providing pumping pressure to supply water to the RO membrane filter 113.

As shown in FIG. 2, the pressure pump P may be installed in a purified water line 114 between the sediment filter 111 and the pre-carbon filter 112, or may be installed in the purified water line 114 between the pre-carbon filter 112 and the RO membrane filter 113. Alternatively, the pressure pump P may not be provided according to the pressure of raw water supplied from the raw water supply unit W. The pressure pump P may be configured as a booster pump having a general structure employed in an RO membrane water purifier, or the like, but the present invention is not limited thereto.

A flow rate detection unit PS may be provided to detect a flow rate of raw water introduced to the filter unit 110. The flow rate detection unit PS may be configured to include a low pressure switch (LPS) which detects a water pressure of the raw water supplied from the raw water supply unit W. When the water pressure is higher than an appropriate water pressure, the flow rate detection unit PS is switched to supply an operation signal to the pressure pump P.

The storage tank 170 stores purified water which has passed through the filter unit 110 and selectively discharges the purified water. The storage tank 170 receives purified water flowing from the post-carbon filter 114, and accommodates sterilization water flowing from the electrolytic sterilizer 130 (to be described).

In detail, the storage tank 170 stores purified water at room temperature which has been purified through the filter unit 110 and cold purified water obtained by cooling a portion of the purified water at room temperature. To this end, the storage tank 170 includes a first storage unit 171 forming a storage space for storing purified water at room temperature and a second storage unit 172 forming a storage space for storing cold purified water. Here, it will be obvious that the storage tank 170 may be formed as a storage space for storing only purified water at room temperature, and the first and second storage units 171 and 172 may be possibly configured as an independent tank, respectively.

The first and second storage units 171 and 172 may be interconnected and demarcated in a vertical direction. The first storage unit 171 is positioned on an upper side and the second storage unit 172 may be positioned on a lower side of the first storage unit 171.

Here, the first and second storage units 171 and 172 may be demarcated by a separator (not shown) in a vertical direction and interconnected.

Water level sensors 175a, 175b, and 175c for detecting the level of purified water and outputting a corresponding detection signal to the control unit 190 are installed in the first storage unit 171. Here, the water level sensors 175a, 175b, and 175c may be classified into a low water level sensor 175a for sensing a low limit level of purified water, namely, a low water level at which purified water is re-supplied, a middle water level sensor 175b for sensing a middle level, and a high water level sensor 175c for sensing a high limit level, namely, a high water level at which an additional introduction of purified water is cut off. The number and installation positions of the water level sensors may vary according to a specific control scheme of the water treatment apparatus (i.e., water purifier).

In this case, the operation of the raw water cutoff valve WV as mentioned above is determined by the low water level sensor 175a and the high water level sensor 175c. When an ON signal is input from the high water level sensor 175c as the first storage unit 171 is filled with purified water, the raw water cutoff valve WV may be closed by the control unit 190, and when an OFF signal is input from the low water level sensor 175a, the raw water cutoff valve WV may be opened by the control unit 190 to allow purified water to be introduced.

A cooling unit 173 for cooling purified water flowing from the first storage unit 171 is installed in the second storage unit 172. Preferably, the cooling unit 173 is configured as a cooling coil well known in the art, but the present invention is not limited thereto.

A first water intake line 178a allowing purified water to be discharged therethrough is connected to the first storage unit 171, and a second water intake line 178b allowing cold purified water to be discharged therethrough is connected to the second storage unit 172. The first and second water intake lines 178a and 178b meet and are connected to a water intake cock 179. Alternatively, the water intake cock 179 may be installed in both of the water intake lines 178a and 178b.

A valve (See 277a and 277b of FIG. 8) is installed in the first and second water intake lines 178a and 178b, respectively, so, it is natural that the first and second water intake lines 178a and 178b may be selectively switched (i.e., opened or shut) by operating the valve by means of the control unit 190 according to a user's selection.

Namely, the purified water at room temperature stored in the first storage unit 171 may be discharged through the first water intake line 178 and output via the water intake cock 179, and the cold purified water stored in the second storage unit 172 may be discharged through the second water intake line 178b and output via the water intake cock 179.

In addition, both the first and second water intake lines 178a and 178b may be opened by operating the valve (not shown) by means of the control unit 190 to allow the purified water at room temperature stored in the first storage unit 171 and the cold purified water stored in the second storage unit 172 to be simultaneously discharged through the first and second water intake lines 178a and 178b and output via the water intake cock 179.

As shown in FIGS. 2 to 5, the electrolytic sterilizer 130 is installed in the sterilization water line 142 and has a structure in which sterilization water, including a substance such as a mixed oxidant (MO) having a sterilizing function, can be generated through electrolysis by using only purified water which has been filtered through at least some of the filters provided in the filter unit 110.

The electrolytic sterilizer 130 allows water to pass through electrodes having different polarities to thus make microbes or germs remaining in water sterilized or become extinct. In general, sterilization of purified water through electrolysis is undertaken by performing both a direct oxidation reaction for directly oxidizing microbes at a positive electrode and an indirect oxidation reaction for enabling various mixed oxidants (MOs), e.g., residual chlorine, ozone, OH radicals, oxygen radicals, or the like, which may be generated from the positive electrode, to oxidize microbes.

In the present embodiment, the electrolytic sterilizer 130 performs electrolysis by using purified water which has been filtered through at least some of the filters provided in the filter unit 110 and chloride ions ($Cl^-$) included in the filtered purified water, so residual chlorine and $H^+$ ions are generated from a positive (+) electrode and $OH^-$ ions are generated from a negative (−) electrode, and accordingly, the overall pH is neutral. When pH is neutral, residual chlorine mostly exists as HOCl.

In detail, residual chlorine, according to the pH change, mostly exists in the form of HOCl when the pH is neutral, but when pH increases, $OCl^-$ is increased, and when pH is 8 or greater (alkaline), the residual chlorine mostly exists in the form of $OCl^-$. Conversely, when the pH is reduced, the amount of $Cl_2$ increases, and when the pH is reduced to be 2 or smaller, the amount of $Cl_2$ is sharply increased to reduce the amount of HOCl. In this case, sterilization capability is in order of HOCl, $OCl^-$, $NH_2Cl$, and HOCl has sterilization capability of about 70 times that of $OCl^-$ and 300 times that of $NH_2Cl$. Thus, when the same amount of residual chlorine exists, it is noted that HOCl is the most advantageous.

In the present embodiment, since electrolysis is performed by using the water and residual chlorine included in the raw water in the electrolytic sterilizer 130, pH is neutral and the residual chlorine exists in the form of HOCl, thus maximizing sterilization capabilities.

Meanwhile, in the related art in which sterilization chemicals, e.g., NaOCl, are dissolved in water to create residual chlorine, the pH level of the solution is 10 or higher and the residual chlorine mostly exists in the form of $OCl^-$. In this case, the strength of sterilizing power is about 1/70 of that of HOCl, which results in the necessity of a sterilizing material having a large capacity of about 70 times that of HOCl. Also, in case of using sterilization chemicals, since $Cl^-$ provided from NaOCl, rather than $Cl^-$ dissolved in water, is used, a plurality of $Cl^-$ exceeding solubility are discharged to the outside atmosphere, failing to use all $Cl^-$ supplied from NaOCl, and resulting in a generation of chlorine gas.

Meanwhile, in the related art in which a sterilizing material is generated by using chloride through electrolysis (See FIG. 1), since pH becomes neutral, a strong sterilizing power can be obtained likewise as in the present embodiment, but the added chloride causes a bad smell and generates a large amount of gas.

In detail, when electrolytes such as chloride are put into water, basic total dissolved solids (TDS) of the water are increased hundreds of times to generate a TDS level of hundreds to thousands of ppm. When power is applied to the water of such high TDS, every oxidizable material included in the water is oxidized to generate various oxidized materials as well as residual chlorine to generate a bad smell and a gas such as hydrogen or chlorine gas. Namely, compared with the present embodiment, the related art in which chloride is added can implement a similar residual chlorine concentration to that of the present embodiment, but the impurities included in the chloride may lead to a generation of a great amount of materials other than the residual chlorine.

As a result, since the residual chlorine and other materials are dissolved (or contained) in the water, the solubility of the residual chlorine becomes relatively low, and thus, the residual chlorine is increasingly gasified to be discharged to the outside atmosphere, shortening a time for the residual chlorine to remain in the water. Thus, in the related art, in order to implement the same sterilizing power as that of the present embodiment, a substantially higher concentration of residual chlorine must be generated. Then, a stronger smell may be caused, power consumption increased, and a life span of the electrode shortened. In addition, if the water of the high TDS is not properly rinsed, it may affect the entire TDS concentration of the purified water, potentially changing the taste of water, so the rinsing operation must be performed several times.

In comparison, however, in the present embodiment, since the electrolytic sterilizer 130 performs electrolysis by using the water and the residual chlorine included in the raw water, pH becomes neutral, and as a result, the residual chlorine exists in the form of HOCl, maximizing the sterilizing capability and eliminating the possibility of generating gas or bad smell due to impurities.

Also, in the case of using chloride (an electrolyte) as in the related art, the addition of an electrolyte increases the current, shortening the life span of the electrode and consuming excessive power. In comparison, in the present embodiment, an electrolyte is not added, allowing a low current to be used as compared with the related art, and thus, a smaller amount of power is consumed.

In this manner, in the present embodiment, the electrolytic sterilizer 130 can be driven at a low current and low power. For example, the electrolytic sterilizer 130 can be driven at a maximum current of 0.5 A or lower, preferably, at 0.35 A or lower, and can be driven at a maximum voltage of 30V or lower, preferably, at 24V or lower. Of course, power consumption of the electrolytic sterilizer 130 can be operated within 10 W.

In order to generate a sterilizing material without adding (or using) chloride (an electrolyte), in the present embodiment, ruthenium (Ru) may be coated on an electrode body of the positive electrode. Ruthenium (Ru) serves as a catalyst lowering a potential difference when $Cl^-$ is reduced to $Cl_2$, and $Cl_2$ generated in water by virtue of ruthenium (Ru) is immediately dissolved to become HOCl (residual chlorine). A flow rate and voltage conditions may be set such that the activity of the ruthenium (Ru) catalyst is maximized.

Also, in the present embodiment, ruthenium (Ru) is coated on the electrode body of the positive electrode (more accurately, ruthenium is coated on the electrode body of the positive electrode and then heated at a high temperature so as to be oxidized and changed to ruthenium oxide (RuOx), so ruthenium oxide (RuOx) remains on the surface of the electrode. In this case, however, since the material coated in generating the electrode at an initial stage is ruthenium, the meaning of a 'coating of ruthenium' is used to include the changed state of ruthenium oxide in the present disclosure). Thus, in order to prevent damage to the coated ruthenium, a high voltage cannot be used, and thus, it is effective to set a maximum voltage of 30 volts, preferably, 24 volts, and power within 10 watts in order to increase the activity of the ruthenium (Ru) catalyst and prevent damage to the coated ruthenium.

The use of ruthenium (Ru) on the electrode body may generally shorten the life span of the electrode, but in the present embodiment, as afore-mentioned, since the electrolytic sterilizer 130 can be driven with a low current, the life span of an electrode can be prevented from being shortened. In order to further lengthen the life span of the ruthenium (Ru)-coated electrode, preferably, the current is further reduced, and to this end, preferably, a negative electrode, a counterpart electrode, is formed only as a titanium (Ti) electrode without a coating operation being performed thereon.

That is, the use of titanium (Ti) as a material of the negative electrode can achieve the effect of lowering the current at the same voltage, and when the current is lowered, power can be reduced, which leads to the life span of the negative electrode and the positive electrode being advantageously lengthened.

As discussed above, according to the present embodiment, the ruthenium (Ru)-coated electrode is used as the positive electrode and the negative electrode made of titanium is used, and the space between the electrodes is appropriately adjusted, thereby obtaining an effect in which a sterilizing material having a desired concentration can be generated with the use of a low current or low power without adding chloride (an electrolyte).

Meanwhile, according to the present embodiment, the electrolytic sterilizer 130 may include a single positive electrode and two negative electrodes disposed at both sides of the positive electrode.

Of course, two sheets of positive electrodes and one negative electrode sheet may be used, or one positive electrode sheet and one negative electrode sheet may be used, but in order to minimize the current value while implementing the concentration of the sterilizing material, preferably, one positive electrode sheet and two negative electrode sheets are used, and in this case, they are disposed on the form of a negative (−) electrode, a positive (+) electrode, and a negative (−) electrode.

When power is applied to the electrolytic sterilizer 130 having such a configuration, sterilization water including the mixed oxidant is generated and supplied to the first storage 171 of the storage tank 170.

In detail, as shown in FIGS. 2 and 3, the electrolytic sterilizer 130 may be installed in the sterilization water line 142 between the purified water line 141 at a front stage of the RO membrane filter 113 (or the hollow fiber membrane filter) and the storage tank 170. Namely, the electrolytic sterilizer 130 may be installed in the sterilization water line 142 diverged from a flow path of a front stage of the RO membrane filter 113 and connected to the storage tank 170. In more detail, the electrolytic sterilizer 130 may be installed between the sediment filter 111 and the RO membrane filter 113, namely, between the sediment filter 111 and the pre-carbon filter 112 or between the pre-carbon filter 112 and the RO membrane filter 113, and when the sediment filter 111 and the pre-carbon filter 112 are provided as a single complex filter 211 as shown in FIG. 8, the electrolytic sterilizer may be installed in a sterilization water line 242 diverged from a flow path between the complex filter 211 and an RO membrane filter 213. In the drawings, the embodiment in which the sterilization water line 142 is diverged from the flow path between the sediment filter 111 and the pre-carbon filter 112 is not specifically illustrated, but this configuration will obviously also be included in the scope of the present invention. This configuration can also be applicable in the same manner when the hollow fiber membrane filter, instead of the RO membrane filter 113, is used.

A flow path changing valve 120 may be provided in a portion at which the purified water line 141 at the front stage of the RO membrane filter 113 and the sterilization water line 142 are connected. The flow path changing valve 120 supplies purified water flowing from the front stage of the RO membrane filter 113 to any one of the purified water line 141 and the sterilization water line 142.

In this manner, in the first and second embodiments of the present invention, since the sterilization water line 142, along which purified water which has passed through at least a portion of the filter unit 110 to generate sterilization water is configured as a flow path independent of the purified water line 141, a flow rate with respect to the sterilization water line 142 can be separately adjusted to facilitate controlling of the concentration of the mixed oxidant (MO) generated by the electrolytic sterilizer 130.

Meanwhile, in the first embodiment illustrated in FIG. 2, the purified water line 141 after the post-carbon filter 114 is configured to be connected to the sterilization water line 142 and then connected to the storage tank 170, while in the second embodiment illustrated in FIG. 3, the purified water line 141 after the post-carbon filter 114 is directly connected to the storage tank 170, so the sterilization water line 142 after the electrolytic sterilizer 130 is formed as a flow path independent from the purified water line 141. Thus, in the second embodiment of FIG. 3, sterilization water is not introduced to the purified water line 141 after the post-carbon filter 114, so the sterilization water remaining at the sterilization water flow path 142 can be prevented from being mixed with the purified water for drinking.

The drain unit 150 serves to selectively discharge sterilization water stored in the storage tank 170. For example, the drain unit 150 may be configured to be connected to the second storage unit 172 positioned at the lower portion of the storage tank 170.

The drain unit 150 may include a drain line 151 connected to the storage tank 170, and a flow path changing valve 157 for changing a flow path between the drain line 151 and a drain pipe dL.

The drain line 151, serving to discharge sterilization water or water stored in the storage tank 170 as concentrated water, is provided as a discharge tube connected to a lower end portion of the second storage unit 172.

The flow path changing valve 157 is installed in the drain line 151, and a valve spool rotates according to an electrical signal from the control unit 190. The flow path changing valve 157 is provided as a direction changing valve for changing a flow path.

The flow path changing valve 157 is also connected to a drain valve dV installed in the drain pipe dL of the RO membrane filter 113. Namely, the flow path changing valve 157, being operated by the control unit 190, may open the drain line 151 and shut the flow path of the drain pipe dL or shut the drain line 151 and open the drain pipe dL.

The drain unit 150 may further include a drain pump 155 installed in the drain line 151 as necessary. The drain pump 155 installed on the drain line 151 discharges water stored in the storage tank 170 by applying a certain pumping pressure. The provision of the drain pump 155 can quickly drain water stored in the storage tank 170, reducing time required for sterilizing and cleansing the water treatment apparatus (i.e., water purifier).

The control unit 190 controls a general operation of the water treatment apparatus 100. In detail, the control unit 190 controls various operation modes implemented in the water treatment apparatus 100. Here, the operation modes of the water treatment apparatus 100 include a water purification mode in which raw water is purified through the filter unit 110, a sterilization mode in which sterilization water is generated through the electrolytic sterilizer 130 and the drain unit 150 and the storage tank 170 and the flow path are sterilized with the sterilization water, and the like. In FIGS.

2 to 5, the control unit 190 is illustrated to only be connected to the raw water cutoff valve WV, the electrolytic sterilizer 120, the drain pump 155, and water level sensors 175a, 175b, and 175c, but the control unit 190 is configured to control various elements, such as the flow rate detection unit PS, the flow path changing valve 157, the cooling unit 173, and the like, which are required to be electrically and electronically controlled.

Meanwhile, in the water purification mode, the control unit 190 controls various elements to purify raw water by means of the filters 111 to 114 of the filter unit 110, and in the sterilization mode, the control unit 190 controls the operation of cutting off the raw water filtering process and simultaneously partially discharging purified water stored in the storage tank 170, operating the electrolytic sterilizer 130 to generate sterilization water, storing the generated sterilization water in the storage tank 170, and automatically discharging the sterilization water through the drain unit 150 at a pre-set time or according to a user's selection.

In this case, the control unit 190 controls the general operation mode of the water treatment apparatus 100 by a general memory unit (not shown) which stores logics of various data values according to operational switch signals or a pre-set time required for operating the water purification mode and the sterilization mode.

The control unit 190 applies a control signal to the foregoing valves and pumps at a pre-set time or according to a switching signal to control the operation of the valves and pumps.

The operation of the water treatment apparatus 100 according to the first and second embodiments of the present invention will be described with reference to FIGS. 4 and 5.

First, the water purification mode will now be described with reference to FIG. 4.

When the low water level sensor 175a provided in the storage tank 170 detects that water has reached a low water level (or a water supplement level), a corresponding signal is delivered to the control unit 190. Then, the raw water cutoff valve WV is opened by the control unit 190 to allow raw water to be introduced from the raw water supply unit W. The raw water supplied from the raw water supply unit W sequentially passes through the filters 111 to 114 provided in the filter unit 110 to generate purified water. The raw water filtering operation in the filter unit 110 is general, so a detailed description thereof will be omitted.

The purified water which has filtered through the filter unit 110 is supplied to the storage tank 170 until such time as the water level of the storage tank 170 reaches a high water level, and when the high water level sensor 175c detects the high water level, the control unit cuts off the raw water cutoff valve WV to terminate the water purification mode. The purified water stored in the storage tank 170 is extracted from the water intake cock 179 according to a user's selection.

Meanwhile, the water treatment apparatus 100 according to the present embodiment may be changed to the sterilization mode at every pre-set time or according to a user's selection, and the operation of the water treatment apparatus 100 in the sterilization mode will be described with reference to FIG. 5.

First, in a state in which the sterilization mode of the water treatment apparatus 100 starts, the pressure pump P and the electrolytic sterilizer 130 are in an OFF state under the control of the control unit 190, the flow path changing valve 157 shuts the drain pipe dL and opens the drain line 151 according to an operation by the control unit 190.

In this state, when the drain pump 155 is provided, the control unit 190 applies an electrical signal to the drain pump 155 to operate it to discharge purified water in the storage tank 170 through the drain line 151 by a pumping pressure of the drain pump 155 until such time as the water level of the purified water reaches a pre-set level, stops the operation of the drain pump 155 and shuts the drain line 151 through the flow path changing valve 157. Meanwhile, when the drain pump 155 is not provided, the control unit 190 may operate a drain valve (See 252 in FIG. 8) to open the flow path of the drain line 151. By discharging the purified water in this manner, the storage tank 170 can secure a space in which purified water is sterilized through electrolysis generated by operating the electrolytic sterilizer 130 and the mixed oxidant is to be received. Namely, when sterilization water is introduced into the storage tank 170 without discharging the purified water accommodated in the storage tank 170, an overflow phenomenon may occur in the storage tank 170, so in order to prevent the overflow phenomenon, the space allowing for the sterilization water to be introduced is secured. Namely, when the sterilization water is introduced into the storage tank 170 without discharging the purified water accommodated in the storage tank 170, an overflow phenomenon may occur in the storage tank 170. Thus, in order to prevent the occurrence of the overflow phenomenon, the space for allowing the sterilization water to be introduced is secured. When the sterilization mode starts, the storage tank 170 may be drained to be completely emptied (or sufficiently emptied such that the storage tank 170 has a low water level or a water level close to the bottom of the storage tank), but, in order to prevent purified water wastage and prevent time for performing the overall sterilization mode from being lengthened due to the time required for draining the storage tank 170, partial draining is preferred. For such a partial draining operation, the middle water level sensor 175b is installed in a slightly lower side of the high water level sensor 175 in the storage tank 170, and the draining may be performed until such time as the middle water level sensor 175b senses a middle water level, or alternatively, the drain pump 155 may be operated only for a certain period of time or the drain valve (See 252 in FIG. 8) provided to the drain unit may be open only for a certain period of time in consideration of a draining amount of water. In particular, when the middle water level sensor 175b is in use, the capacity of water accommodated in the storage tank 170 can be accurately checked, so after the sterilization water including a mixed oxidant is introduced to be mixed in the storage tank 170, the concentration of the mixed oxidant included in the entirety of the storage tank 170 can be adjusted to a pre-set value as close as possible. Thus, the phenomenon in which more mixed oxidant is introduced to the storage tank 170 than is necessary, to worsen the taste of water due to the excessive amount of residual mixed oxidant after the rinsing operation can be prevented, and the phenomenon in which the effect of the sterilization and cleansing is reduced due to a mixed oxidant of less than a proper concentration can be also prevented.

As shown in FIG. 5, the control unit 190 opens the raw water cutoff valve WV to allow raw water to be introduced, and operates the pressure pump P to filter the raw water. At this time, an electrical signal is applied to the flow path changing valve 120 to connect the flow path at a front stage of the RO membrane filter 113, i.e., the flow path between the sediment filter 111 and the RO membrane filter 113, and the sterilization water line 142 in order to allow purified water which has been filtered at a front stage of the RO membrane filter 113 to flow into the electrolytic sterilizer 130.

Here, the sediment filter 111 serves to adsorb and remove solid substances, such as floating matter, sand, or the like, having relatively large particles included in the raw water, and the pre-carbon filter 112 serves to remove chemical materials, such as volatile organic compounds, carcinogenic substances, synthetic detergents, insecticides, or the like, harmful to a human body, and a residual chlorine (e.g., HOCl or ClO) component included in the water through an active carbon absorption method, so the chloride ions $Cl^-$ included in the raw water can be maintained as they are (approximately 10 to 20 ppm, although it is different according to raw water), although they pass through the sediment filter 111 and the pre-carbon filter 112.

In particular, an active carbon filter, such as the pre-carbon filter 112, contains a mineral component, so water passing through the active carbon dissolves an inorganic substance of the active carbon to assume alkalescence (i.e., weak alkaline water). The alkaline water, having reducing power, reduces the residual chlorine ($Cl_2$, HOCl, ClO) in the water into chloride ions ($Cl^-$) harmless to the human body, and various harmful materials are adsorbed to the pores of the active carbon, thus removing impurities or chemical materials in the water.

Thus, the purified water which has been filtered through the sediment filter 111 or through both the sediment filter 111 and the pre-carbon filter 112 has a concentration of chloride ions almost similar to that of raw water (e.g., approximately 10 to 20 ppm), and the chloride ions and other materials included in the purified water which has passed through the sediment filter 111 and/or the pre-carbon filter 112 are generated as a mixed oxidant through electrolysis (oxidation-reduction reaction) of the electrolytic sterilizer 130. In particular, the purified water which has passed through only the sediment filter 111 or which has passed through the sediment filter 111 and the pre-carbon filter 112, without passing through the RO membrane filter 113, includes a large amount of total dissolved solids (TDS) (the amount of solids including mineral components such as calcium, magnesium, iron, or the like, dissolved in water), providing conditions in which the electrolysis reaction (oxidation-reduction reaction) can be smoothly performed by the electrolytic sterilizer 130.

Meanwhile, when the purified water passes through the RO membrane filter 113, a significant amount of the solids are removed to damp the smooth electrolysis reaction (oxidation-reduction reaction), which thus requires a high voltage, and in addition, since a large amount of materials, such as chloride ions, or the like, required for generating the mixed oxidant are also removed to lower the concentration of the mixed oxidant so as not to be sufficient for sterilization.

In this manner, the purified water supplied through the sediment filter 111 positioned at the front stage of the RO membrane filter 113 or through the sediment filter 111 and the pre-carbon filter 112 includes the large amount of TDS and has a state of having chloride ions of a similar level to that of raw water, and the purified water having such a phase is supplied to the electrolytic sterilizer 130.

For example, the concentration of chloride ions included in the purified water which has passed through only the sediment filter 111, or through both the sediment filter 111 and the pre-carbon filter 112 is almost equal to the concentration (in general, 10 to 20 ppm) of the chloride ions included in raw water, so a sufficient amount of chloride ions can be introduced into the electrolytic sterilizer 130, and since the electrolyte, i.e., the TDS, required for electrolysis is sufficient, sterilization water including the mixed oxidant of 2 to 3 ppm can be generated by regulating the inflow capacity (litter/min.) of purified water introduced into the electrolytic sterilizer 130, current, voltage, and the like. This may be verified through experimentation.

Meanwhile, even when the amount of TDS included in the purified water which has passed through only the sediment filter 111 or through both the sediment filter 111 and the pre-carbon filter 112 is a lot greater than an appropriate range (e.g., even when it exceeds 30 ppm), a mixed oxidant having a stable concentration can be generated by controlling the voltage and/or current of the electrolytic sterilizer 130. Details of the controlling of the electrolytic sterilizer 130 to generate a mixed oxidant having a stable concentration are disclosed in a former patent application (Korean Patent Application No. 2010-0062233), not published, by the applicant of this invention, so a detailed description thereof will be omitted.

As discussed above, the electrolytic sterilizer 130 has a sufficient amount of chloride ions, it can electrolyze only purified water introduced without additional electrolytes, e.g., chloride (sodium chloride, potassium chloride, etc.) to generate a high concentration mixed oxidant, and since the concentration of the TDS is high, the electrolytic sterilizer 130 can generate a mixed oxidant having a sufficient concentration for sterilization even with a low current or low voltage driving.

The high concentration (e.g., 2 to 3 ppm) sterilization water generated by the electrolytic sterilizer 130 is supplied to the storage tank 170 through the sterilization water line 142 until such time as the water level of the storage tank 170 reaches a high water level.

The high concentration sterilization water supplied to the storage tank 170 is mixed with the purified water accommodated in the storage tank 170 to make the mixed oxidant having a certain concentration come in contact with an inner wall of the storage tank 170, whereby the inner wall of the storage tank 170 can be sterilized by the sterilization water. For example, when the concentration of the mixed oxidant included in the sterilization water supplied to the storage tank 170 is 2 to 3 ppm, it can be mixed with the purified water remaining in the storage tank 170 to adjust the concentration of the mixed oxidant to be 0.05 to 0.15 ppm, expectedly achieving sterilization efficiency. In particular, considering that the concentration of the mixed oxidant required for sterilization is 0.05 ppm, preferably, the concentration of the mixed oxidant within the storage tank 170 in the wake of the inflow of the sterilization water is adjusted to be approximately 0.07 to 0.13 ppm, slightly higher than 0.05 ppm, to obtain a stable sterilization effect.

When the sterilization water provided to the storage tank 170 has a high water level, a detection signal of the high water level sensor 175c is output to the control unit 190, and the control unit 190 shuts the raw water cutoff valve WV.

When the storage tank 170 has a high water level according to the inflow of the sterilization water after the lapse of a certain time from the point in time when the storage tank 170 has a high water level, the control unit 190 applies an electrical signal to the drain pump 155 (when the drain pump 155 is installed) to operate the drain pump 155, and at the same time, applies an electrical signal to the flow path changing valve 157 to open the drain line 151 toward a concentrated water discharge side.

Then, the sterilization water stored in the storage tank 170 is discharged through the drain line 151 by pumping pressure from the drain pump 155, and discharged as concentrated water through the flow path changing valve 157. If the drain pump 155 is not provided, the control unit 190 may open the drain valve (See 252 in FIG. 8) provided to the drain line 151 for a sufficient time for drainage, to thus control the drainage of the storage tank 170.

As for the draining operation of the sterilization water, it may be configured such that after the draining operation is performed during a pre-set period of time, the operation of the drain pump 155 is interrupted, but preferably, in order to prevent the drain pump 155 from being driven for a time more than need be, the control unit 190 may detect a generation of an overload to the drain pump 155 due to termination of drainage of the storage tank 170 (including a state in which draining is not performed although water remains in the storage tank) to thus terminate the draining operation.

When the sterilization water is completely drained, the control unit 190 may open the raw water cutoff valve WV to perform a rinsing operation.

However, since the concentration of the mixed oxidant in the storage tank 170 is approximately 0.05 to 0.15 ppm in the sterilization, a very small amount of the mixed oxidant remains in the storage tank 170 after the sterilization water is drained, and when purified water is re-introduced to the storage tank 170 later, the concentration of the mixed oxidant is so low that the mixed oxidant cannot be detected and the user cannot sense a change in the taste of water due to the mixed oxidant, so a rinsing operation may not be performed. In particular, in the present embodiment, since only purified water is electrolyzed, without supplying chloride, and the concentration thereof is controlled to be below a reference value for drinking water, even if the sterilization material is ingested, it is not harmful to a human body.

However, in order to ensure the reliable elimination of the sterilization material such as the mixed oxidant, or the like, the rinsing operation may be performed.

The rinsing operation is performed by filtering supplied raw water through only the sediment filter 111, or through both the sediment filter 111 and the pre-carbon filter 112 and then supplying the filtered water to the storage tank 170. In this case, the purified water supplied to the storage tank 170 is supplied through the sterilization water line 142, but since the electrolytic sterilizer 130 is in an OFF state, sterilization water is not generated. Namely, the flow path in the rinsing operation is the same as the flow path illustrated in FIG. 5, and the rinsing operation is performed with the electrolytic sterilizer 130 turned off.

Meanwhile, in order to perform the rinsing operation, purified water may be supplied to the storage tank 170 up to the high water level water. However, when purified water is supplied up to the high water level, excessive time may be required for supplying purified water (rinsing water) and draining it and a large amount of water may be wasted. Thus, in the present embodiment, in performing the rinsing operation, it is effective that the amount of purified water (rinsing water) supplied to the storage tank 170 is as much as it can rinse the bottom surface of the storage tank 170 on which sterilization water may greatly remain in draining the sterilization water. To this end, a pre-set amount, smaller than the amount corresponding to the high water level of the storage tank 170, of purified water (rinsing water) may be supplied to the storage tank 170. For example, it may be sufficient to supply purified water by a water level lower than the low water level which can be sensed by the low water level sensor 175a.

As discussed above, the water treatment apparatus 100 according to the present embodiment performs the process of sterilizing purified water and generating a sterilizing material including a mixed oxidant (MO) through electrolysis, supplies the sterilization water including the mixed oxidant, or the like, to the storage tank 170, and automatically discharges the sterilization water stored in the storage tank 170, thus sterilizing the interior of the storage tank 170 and the purified water discharge flow path.

Thus, unlike the related art in which the storage tank, or the like, is sterilized by adding sterilization chemicals, or the like, through an offline service, in the water treatment apparatus 100 according to the present embodiment, sterilization water is generated, stored in the storage tank 170, and then discharged at a pre-set time or according to a user's selection, thus automatically sterilizing the storage tank 170 and the purified water discharge flow path. Thus, the water treatment apparatus 100 according to the present embodiment is automatically sterilized at a pre-set time or according to a user's selection, the sterilization management of the water treatment apparatus can be facilitated, the reliability of the apparatus can be improved, and the apparatus can have a comparative advantage in terms of competitiveness.

In particular, in the water treatment apparatus 100 according to the present embodiment, since purified water including a large amount of chloride ions and TDS is introduced to the electrolytic sterilizer 130 through a portion of the filter unit 110, sterilization water including a high concentration mixed oxidant can be stably generated even without the supply of chloride (electrolyte). In addition, since sterilization water is generated only through purified water without the supply of chloride, the user can be supplied with it without causing a problem of stability.

[Third Embodiment]

FIG. 6 is a schematic block diagram of a water treatment apparatus according to a third embodiment of the present invention.

The water treatment apparatus 100 according to a third embodiment of the present invention basically has the same structure as that of the second embodiment illustrated in FIG. 3, except that a connection member and a valve connector 159 are additionally provided. Here, the valve connector 159 is formed at the drain unit 150 and connected to the connection member 180. Thus, in order to avoid unnecessary repetition, a detailed description of the same or similar content will be omitted and the same reference numerals will be used for the same or equivalent elements.

As shown in FIG. 6, in the water treatment apparatus 100 according to the third embodiment of the present invention, sterilization water including a mixed oxidant generated by the electrolytic sterilizer 130 is supplied to the storage tank 170 to sterilize an inner wall of the storage tank 170 and, at the same time, the sterilization water stored in the storage tank 170 is discharged to the water intake cock 179 through the first and second water intake lines 178a and 178b. Accordingly, the water intake lines 178a and 178b and the water intake cock 179 can be can be sterilized by sterilization water. In particular, in the water treatment apparatus 100 illustrated in FIG. 6, sterilization water discharged to the water intake cock 179 is not required to be received by a drain container but can be drained through the drain unit 150 installed within the water treatment apparatus 100.

To this end, the connection member 180 connecting the drain line 151 of the drain unit 150 and the water intake cock 179 is provided in the third embodiment illustrated in FIG. 6.

As shown in FIG. 6, one side of the connection member 180 is connected to the water intake cock 179 and the other side thereof is connected to the drain unit 150. The connection member 180 is configured to supply sterilization water discharged through the water intake cock 179 to the drain line 151.

As shown in FIG. 7, the connection member 180 includes a first connection cap 181 detachable with respect to the water intake cock 179, a second connection cap 182 detachable with respect to the valve connector 159 installed on the drain line 151 of the drain unit 150, and a connection hose 183 connecting the first and second connection caps 181 and 182.

In this case, the connection member 180 may be made of a rubber material having flexibility.

Thus, according to the water treatment apparatus according to the third embodiment of the present invention illustrated in FIG. 6, after the first connection cap 181 of the connection member 180 is coupled to the water intake cock 179 and the second connection cap 182 is connected to the valve connector 159, sterilization mode is initiated. The sterilization mode may start by the selecting of a cock sterilization function provided in a display unit (not shown), but the present invention is not limited thereto.

In the sterilization mode, the control unit 190 opens a valve (not shown) installed in the first and second water intake lines 178a and 178b to allow sterilization water to flow to the first and second water intake lines 178a and 178b, and changes a flow path of the flow path changing valve 157 to allow the drain line 151 and the concentrated water discharge side to be connected. Accordingly, the sterilization water stored in the storage tank 170 is introduced to the drain line 151 through the first and second water intake lines 178a and 178b, the connection member 180, and the valve connector 159, so as to be discharged to the outside.

At this time, the drain pump 155 may be operated to accelerate the outflow of the sterilization water from the storage tank 170, and in this case, a period of time required for sterilizing and cleansing the storage tank 170 can be shortened.

In this manner, according to the third embodiment of the present invention illustrated in FIG. 6, the flow path of the first and second water intake lines 178a and 178b and the interior of the water intake cock 179 can be sterilized by discharging the sterilization water stored in the first and second storage units 171 and 172 of the storage tank 170 to the drain line 151 through the first and second water intake lines 178a and 178b and the water intake cock 179. In addition, since the water treatment apparatus 100 illustrated in FIG. 6 includes the connection member 180, there is no need to furnish a drain container to drain the sterilization water flowing from the water intake cock 179, and the sterilization water can be quickly discharged through the drain pump 155 provided to the drain line 151.

Meanwhile, in the above description, in the water treatment apparatus 100 illustrated in FIG. 6, only the storage tank 170 and the water intake cock 179 are sterilized, but the sterilization water accommodated in the storage tank 170 may be immediately discharged through the drain line 151, without passing through the water intake cock 179, likewise as in the water treatment apparatus 100 illustrated in FIG. 4. In addition, in the water treatment apparatus 100 illustrated in FIG. 6, a selection button may be provided. In a state in which the selection button is connected to the connection member 180, a mode for sterilizing the water intake cock 179 may be carried out

[Fourth Embodiment]

FIG. 8 is a schematic block diagram of a water treatment apparatus according to a fourth embodiment of the present invention, and FIG. 9 is a block diagram showing a flow path configuration of a sterilization mode of the water treatment apparatus illustrated in FIG. 8.

The water treatment apparatus according to the fourth embodiment of the present invention will now be described with reference to FIGS. 8 and 9.

The water treatment apparatus 200 according to the fourth embodiment of the present invention basically has the same structure as that of the second embodiment illustrated in FIG. 3 and has a difference in the substantial configuration of a filter unit 210, a water sterilization line 242, a drain unit 250, and a storage tank 270. Thus, reference numerals similar to or the same as elements of the second embodiment illustrated in FIG. 3 will be increased by '100' so as to be used, and differences will mainly be described in order to avoid unnecessary repetition in description.

When the water treatment apparatus 200 according to the fourth embodiment of the present invention illustrated in FIG. 8 is in the water purification mode, raw water supplied from the raw water supply unit W is supplied to the storage tank 270 through the filter unit 210 and is then supplied to the user through water intake cocks 279a and 279b.

The filter unit 210 has the same structure as that of the filter unit 110 according to the second embodiment illustrated in FIG. 3, except that the sediment filter 111 and the pre-carbon filter 112 illustrated in FIG. 3 are configured as a complex filter 211. Also, in FIG. 8, a pressure pump for pressing raw water introduced to the RO membrane filter 213 is not installed, but the pressure pump P illustrated in FIG. 3 may be installed in the flow path of the front stage of the RO membrane filter 213 according to the pressure of the raw water.

The storage tank 270 includes a first storage unit 271 for accommodating purified water at room temperature, a second storage unit 272 for accommodating cold purified water, and a third storage unit 274 for accommodating warm purified water. When a first extraction valve 277a is open, the purified water at room temperature accommodated in the first storage unit 271 may be discharged to the first water intake cock 279a through the first water intake line 278a, and when a second extraction valve 277b is open, the cold purified water accommodated in the second storage unit 272 is discharged to the first water intake cock 279a through the second water intake line 278b. Also, when a third extraction valve 277c is open, the warm purified water accommodated in the third storage unit 274 may be discharged to the second water intake cock 279b.

A drain line 251 at a lower side of the storage tank 270 is connected to the drain unit 250, and a drain valve 252 may be provided to the drain line 251 adjacent to the storage tank 270. The drain valve 252 may be open by a control unit 290 to discharge water accommodated in the storage tank 270 through the drain line 251.

A first switching valve 221 for opening and shutting a purified water line 241 may be installed in the purified water line 241 at a rear stage of the raw water cutoff valve WV, and a second switching valve 222 for opening and shutting a sterilization water line 242 may be installed in the sterilization water line 242.

A constant flow rate valve 223 may be installed in the sterilization water line 242 in order to make the flow rate of purified water, which is introduced into an electrolytic sterilizer 230 through the complex filter 211 having both the function of the sediment filter and that of the pre-carbon filter, constant. When the constant flow rate valve 223 is installed, sterilization water having a stable concentration can be generated by uniformly maintaining the flow rate of purified water introduced into the electrolytic sterilizer 230. Also, the constant flow rate valve 223 may have an additional function of reducing the pressure of the purified water introduced into the electrolytic sterilizer to uniformly maintain the pressure of the purified water so that sterilization water can be more stably generated by the electrolytic sterilizer 230 and the electrolytic sterilizer 230 cannot be loaded by a change in the pressure of water.

Thus, since the purified water decompressed to have a uniform flow rate through the constant flow rate valve 223 is introduced into the electrolytic sterilizer 230, the concentration of the mixed oxidant can be prevented from being changed by the flow rate or pressure of the inflowing purified water.

In the sterilization mode, sterilization water from the electrolytic sterilizer 200 according to the fourth embodiment illustrated in FIG. 8 passes through the flow path indicated by the arrow in FIG. 9 to sterilize and cleanse the storage tank 270. Also, in the rinsing mode, rinsing water is supplied to the storage tank 270 through the flow path indicated by the arrow in FIG. 9, and at this time, the electrolytic sterilizer 230 is in an OFF state.

In detail, in the sterilization mode, the control unit 290 opens the drain valve 252 and drives the drain pump 255 to discharge a portion of the purified water accommodated in the storage tank 270 in order to prevent the storage tank 270 from overflowing due to the inflow of the sterilization water. Such a partial draining operation may be performed until such time as an OFF signal is sensed by a middle water level sensor 275b or may be performed by opening the drain line 251 for a predetermined period of time.

After the partial draining operation of the storage tank 270 is completed, the control unit 290 opens the raw water cutoff valve WV and the second switching valve 222 and shuts the first switching valve 221 to allow raw water from the raw water supply unit W to flow into the electrolytic sterilizer 230. Accordingly, the raw water is then introduced to the sterilization water flow path 242 through the complex filter 211 having both the function of the sediment filter and that of the pre-carbon filter, decompressed by the constant flow rate valve 223, and flows at a uniform (or constant) flow rate into the electrolytic sterilizer 230. The control unit 290 generates a mixed oxidant having a pre-set concentration range by controlling current and/or voltage supplied to the electrode of the electrolytic sterilizer 230, and accordingly, sterilization water including the mixed oxidant is introduced into the storage tank 270.

In particular, compared with the first to third embodiments of the present invention in which water, passing through the filter unit 110, is simply introduced into the electrolytic sterilizer 130 through the diverged flow path, so the flow rate of the water introduced into the electrolytic sterilizer 130 cannot be regulated, in the fourth embodiment, since the constant flow rate valve 223 is installed in the sterilization water flow path 242, the flow rate of the water introduced into the electrolytic sterilizer 230 can be regulated, so the electrolytic sterilizer 230 can generate a sterilizing material having a stable concentration.

When the sterilization water flows into the storage tank 270, until the water level of the storage tank 270 is at the high water level, the operation of the electrolytic sterilizer 230 is stopped and the second switching valve 222 is shut to stop the generating of the sterilization water and the introduction of the sterilization water into the storage tank 270.

Thereafter, after the lapse of a certain period of time, the sterilization water is drained, and in this process, the drain pump 255 is actuated to considerably shorten the drainage time of the sterilization water and thus shorten the time required for sterilizing and cleansing operations. The draining operation of the sterilization water is performed in the same manner as the partial draining operation, so a detailed description thereof will be omitted.

After the discharging operation of the sterilization water is completed, a rinsing operation is performed in order to remove sterilization water particularly remaining on the bottom surface. Such a rinsing operation is the same as the process of introducing sterilization water into the storage tank 270, except that the electrolytic sterilizer 230 does not operate.

When the supply of the rinsing water is completed, the rinsing water is discharged and new purified water is accommodated in the storage tank 270 through the purified water line 241.

[Fifth Embodiment]

A water treatment apparatus according to a fifth embodiment of the present invention will now be described with reference to FIGS. 10 to 12.

FIG. 10 is a schematic block diagram of a water treatment apparatus according to a fifth embodiment of the present invention, FIG. 11 is a block diagram showing a flow path configuration of a circulative sterilization mode of the water treatment apparatus illustrated in FIG. 8, and FIG. 12 is a block diagram showing a flow path configuration of a sterilization water extraction mode of the water treatment apparatus illustrated in FIG. 10.

The water treatment apparatus 200 according to the fifth embodiment of the present invention basically has the same structure as that of the fourth embodiment illustrated in FIG. 8 and is only different therefrom in that a circulation line 243 and a sterilization water extraction line 244 are provided. Thus, in order to avoid an unnecessary repetition, a detailed description of the same or similar configuration and operation will be omitted and the same reference numerals will be used for the same or similar elements.

The water treatment apparatus 200 according to the fifth embodiment of the present invention illustrated in FIG. 10 includes a circulation line 243 provided between the drain line 251 and the purified water line 241 in order to re-supply sterilization water drained through the drain line 251 to the storage tank 270. The circulation line 243 returns sterilization water to the purified water line 241 to sterilize the purified water line 241, the storage tank 270, and the flow paths connected thereto.

As shown in FIGS. 10 and 11, the circulation line 243 may be configured such that one end of the circulation line 243 is connected to a flow path changing valve 253 provided to the drain line 251 and the other end thereof is connected between the post-carbon filter 214 of the filter unit 210 and the storage tank 270 to sterilize the purified water line 241 between the post-carbon filter 214 and the storage tank 270. In this case, preferably, the circulation line 243 may be connected to the purified water line 241 in a state in which the circulation line 243 is close to the post-carbon filter 214.

Alternatively, the circulation line 243 may be provided between the drain line 241 and the purified water line provided in the interior of the filter unit 210 to sterilize and cleanse the purified water line 241 within the filter unit 210. For example, the circulation line 243 may be connected to the purified water line 241 at a front stage of the post-carbon filter 214 in which contaminants are mainly generated in order to sterilize and cleanse the interior of the post-carbon filter 214 and the purified water line 241 at a rear stage of the post-carbon filter 214.

Alternatively, the circulation line 243 may be connected to the purified water line 241 at a front stage of the RO membrane filter 213, e.g., a flow path between the sediment filter 111 and the pre-carbon filter 112. In this case, however, in order to prevent damage to the RO membrane filter 213 by the sterilization water, a flow path maybe formed to allow the sterilization water to be directly supplied to the storage tank 270 in a roundabout manner, without passing through the RO membrane filter 213, or may be directly supplied to the storage tank 270 through the post-carbon filter 214 in a roundabout manner, without passing through the RO membrane filter 213.

Preferably, the sterilization water passing through the drain line 251 is pressed by the drain pump 255 provided to the drain line 251 to perform smooth circulative sterilization when the sterilization water is re-introduced to the storage tank 270 through the drain line 251, the circulation line 243, and the purified water line 241 from the storage tank 270.

When the user selects circulative sterilization, as shown in FIG. 11, sterilization water, which has been generated by the electrolytic sterilizer and accommodated in the storage tank 270, is circulated to the storage tank 270 through the drain line 251, the circulation line 243, and the purified water line 241. To this end, after the storage tank 270 is filled with the sterilization water, the control unit 290 opens the drain valve 252, changes the flow path of the flow path changing valve 253 to allow the drain line 251 and the circulation line 243 to be connected, and drives the drain pump 255. Then, the sterilization water circulates along the flow path indicated by the arrow 'A'.

After the sterilization water circulates through the circulation line for a predetermined period of time, the control unit 290 changes the flow path of the flow path changing valve 253 to allow the drain line 251 to be connected to the flow path at the drain pipe dL side and drives the drain pump 255. Then, the sterilization water is discharged to the outside along the flow path indicated by the arrow 'B'.

Through this circulative sterilization process, the purified water line 241 at the front stage of the storage tank 270, as well as the storage tank 270, can be sterilized and cleansed.

Thereafter, the rinsing process and the purified water re-injecting process are performed in like manner to the foregoing embodiments.

[Sixth Embodiment]

A water treatment apparatus according to a sixth embodiment of the present invention will now be described with reference to FIGS. 13 and 14.

FIG. 13 is a schematic block diagram of a water treatment apparatus according to a sixth embodiment of the present invention, and FIG. 14 is a block diagram showing a flow path configuration of a circulative sterilization mode of the water treatment apparatus illustrated in FIG. 13.

The water treatment apparatus 200 according to the sixth embodiment of the present invention has basically the same structure as that of the fifth embodiment illustrated in FIG. 8 and is merely different therefrom in that valve connectors 259*a*, 259*b*, and 259*c* are provided to the drain line 251 and a connection member 280 is installed between the first and second water intake cocks 279*a* and 279*b* and the valve connectors 259*a*, 259*b*, and 259*c*. Thus, in order to avoid unnecessary repetition, a detailed description of the same or similar configuration and operation will be omitted and the same reference numerals will be used to refer to the same or similar elements.

Like the water treatment apparatus 200 according to the third embodiment of the present invention illustrated in FIG. 6, the water treatment apparatus 200 according to the sixth embodiment of the present invention illustrated in FIG. 13 is configured to sterilize and cleanse the water intake lines 278*a*, 278*b*, and 278*c* and the water intake cocks 279*a* and 279*b* as well as the storage tank 270. Namely, sterilization water including a mixed oxidant generated by the electrolytic sterilizer 230 is supplied to the storage tank 270 and then discharged to the water intake cocks 279*a* and 279*b* through the water intake lines 278*a*, 278*b*, and 278*c*. Thus, the water intake lines 278*a*, 278*b*, and 278*c*, and the water intake cocks 279*a*, and 279*b* can be sterilized through the sterilization. In particular, the water treatment apparatus 200 illustrated in FIG. 13 is configured to drain sterilization water, discharged to the water intake cocks 279*a* and 279*b*, through the drain unit 250 therein without having to furnish a drain container to receive it.

To this end, the water treatment apparatus 200 illustrated in FIG. 13 includes the connection member 280 (See FIG. 7) connecting the drain line 251 of the drain unit 250 and the water intake cocks 279*a* and 279*b*.

As shown in FIG. 13, the connection member 280 has a structure in which a first connection cap 281 is connected to the first water intake cock 279*a*, a second connection cap 282 is connected to the first valve connector 259*a* of the drain unit 250, and sterilization water discharged through the first water intake cock 279*a* is supplied to the drain line 251. Also, the connection member 280 may be additionally connected between the second water intake cock 279*b* discharging warm purified water and the second valve connector 259*b*, and may also be additionally connected between a warm water drain pipe 276 and the third valve connector 259*c*.

In the water treatment apparatus 200 having the foregoing configuration according to the sixth embodiment of the present invention, after the connection member 280 is connected between the valve connectors 259*a*, 259*b*, and 259*c* and the water intake cocks 279*a* and 279*b* and the warm water drain pipe 276, the sterilization mode is performed. The performing of the sterilization mode may start by selecting a cock sterilization function provided in a display unit (not shown), but the present invention is not limited thereto.

In the sterilization mode of the water intake cocks 279*a* and 279*b*, the control unit 290 opens the extraction valves 277*a*, 277*b*, and 277*c* installed at the first, second, and third water intake lines 278*a*, 278*b*, and 278*c* to allow sterilization water to flow to the first, second, and third water intake lines 278*a*, 278*b*, and 278*c* and changes a flow path of the flow path changing valve 253 to allow the drain line 251 and the concentrated water discharge side to be connected. Accordingly, as shown in FIG. 14, the sterilization water stored in the storage tank 270 is introduced to the drain line 251 through the first, second, third water intake lines 278*a*, 278*b*, and 278*c*, the connection member 280, and the valve connectors 259*a* and 259*b*, so as to be discharged to the outside along the flow path indicated by the arrow 'B'. At this time, the discharge pump 255 may be operated to accelerate the outflow of the sterilization water from the storage tank 270 to thereby shorten time required for sterilizing and cleansing the storage tank 270.

Also, in the sterilization mode of the water intake cocks 279*a* and 279*b* and the purified water line 241, the control unit 290 opens the extraction valves 277*a*, 277*b*, and 277*c* installed at the first, second, and third water intake lines 278*a*, 278*b*, and 278*c* to allow sterilization water to flow to the first, second, and third water intake lines 278a, 278b, and 278c and changes the flow path of the flow path changing valve 253 to allow the drain line 251 and the circulation line 243 to be connected. Accordingly, as shown in FIG. 14, the sterilization water stored in the storage tank 270 flows to the circulation line 253 along the flow path indicated by the arrow 'A' through the first, second, third water intake lines 278a, 278b, and 278c, the connection member 280, and the valve connectors 259a and 259b, and the drain line 251, and then is resupplied to the storage tank 270 through the purified water line 241.

After the sterilization water is circulated through the circulation line 243 for a certain period of time, the control unit 290 changes the flow path of the flow path changing valve 253 to connect the drain line 251 and the flow path of the drain pipe dL side and drives the drain pump 255, to allow the sterilization water to be discharged to the outside along the flow path indicated by the arrow 'B'.

Through such a circulative sterilization process, the storage tank 270, the extraction cocks 279a and 279b, and the purified water line 241 at the front stage of the storage tank 270 can be sterilized and cleansed.

[Seventh Embodiment]

Meanwhile, in the first to sixth embodiments as described above, the electrolytic sterilizers 130 and 230 are fixedly installed in the sterilization water lines 142 and 242 in the water treatment apparatuses 100 and 200, while electrolytic sterilizers 130 and 230 may be manually detached and attached to be used for a sterilization and cleansing operation.

Namely, the water treatment apparatuses 100 and 200 according the first to sixth embodiments have low efficiency in terms of cost because the electrolytic sterilizers 130 and 230 which are high-priced but have a low frequency of use are fixedly installed. Meanwhile, in the case of performing the sterilizing and cleansing operation manually, the user may have difficulty in performing the sterilization and cleansing operation or may not properly perform the sterilization and cleaning operation due to a lack of experience. Thus, preferably, an expert or specialist sanitary manager (a professional cleansing operator) may perform the operation.

To this end, in the case of FIGS. 2 to 6, the electrolytic sterilizer 130 may have a detachable structure, and the electrolytic sterilizer 130 and the sterilization line 142 connected to the electrolytic sterilizer 130 may be separated overall. Namely, one side of the electrolytic sterilizer 130 may be connected to the flow path between the sediment filter 111 and the pre-carbon filter 112 and the flow path between the pre-carbon filter 112 and the RO membrane filter 113 through a known connection means such as fitting, or the like, and the other side of the electrolytic sterilizer 130 may be connected to the flow path between the post-carbon filter 114 and the storage tank 170 through the known connection means such as fitting, or the like, as shown in FIG. 2. Alternatively, the other side of the electrolytic sterilizer 130 may be directly connected to the storage tank 170 as shown in FIGS. 3 to 6. In this case, one side of the electrolytic sterilizer 130 may be connected to the front stage of the RO membrane filter 113 and the flow path of the other side of the electrolytic sterilizer 130 may be positioned at an upper side of the storage tank 170 through a lid in order to allow sterilization water generated by the operation of the electrolytic sterilizer 130 to flow into the storage tank 170.

Also, since the electrolytic sterilizer 130 is detachable, the flow path changing valve 120 of FIGS. 2 to 6 may not be provided, or it may be provided as a simple switching valve.

Meanwhile, in the case of supplying rinsing water to the storage tank 170, purified water, which has only passed through a portion of the filter unit 110, may be introduced into the storage tank 170 through the electrolytic sterilizer 130 in a state in which driving of the electrolytic sterilizer 130 is stopped. Also, the electrolytic sterilizer 130 may be driven manually or the electrolytic sterilizer 130 may be connected to the control unit 190 through a fixed line or wirelessly, whereby the driving of the electrolytic sterilizer 130 can be automatically controlled.

Meanwhile, in the case of FIGS. 8 to 14, the electrolytic sterilizer 230 may also have a detachable structure, and the electrolytic sterilizer 230 and the sterilization line 242 connected to the electrolytic sterilizer 230 may be separated overall. Namely, one side of the electrolytic sterilizer 230 may be connected to the flow path between the complex filter 211 having both functions of the sediment filter and the pre-carbon filter and the RO membrane filter 213 through a known connection means such as fitting, or the like, and the other side of the electrolytic sterilizer 230 may be directly connected to the storage tank 270. In this case, one side of the electrolytic sterilizer 230 may be connected to the front stage of the RO membrane filter 213 and the flow path of the other side of the electrolytic sterilizer 230 may be positioned at an upper side of the storage tank 270 through a lid in order to allow sterilization water generated by the operation of the electrolytic sterilizer 230 to flow into the storage tank 270.

Since the electrolytic sterilizer 230 is detachable, the second switching valve 222 in FIGS. 8 to 14 may not be provided.

Meanwhile, in the case of supplying rinsing water to the storage tank 170, purified water, which has passed through only a portion of the filter unit 210, may be introduced into the storage tank 270 through the electrolytic sterilizer 230 in a state in which the driving of the electrolytic sterilizer 230 is stopped. Also, the electrolytic sterilizer 230 may be driven manually or the driving of the electrolytic sterilizer 230 may be connected to the control unit 290 through a fixed line or wirelessly so as to be automatically controlled.

Also, as shown in FIGS. 8 to 14, the constant flow rate valve 223 may be additionally installed at the front stage of the detachable electrolytic sterilizer 230 to make a flow rate of sterilization water introduced to the electrolytic sterilizer 230 constant (or uniform). Here, since the constant flow rate valve 223 is required for operating the electrolytic sterilizer 230, it may be detachable together with the electrolytic sterilizer 230.

In FIGS. 10 to 14, the sterilization water extraction line 244 is provided to the electrolytic sterilizer 230, but when the electrolytic sterilizer 230 is detachable, in the same manner as in the seventh embodiment, the sterilization water extraction line 244 and the flow path changing valve 255 may not be provided.

A sterilizing and cleansing method of the water treatment apparatus according to another exemplary embodiment of the present invention will be described with reference to FIGS. 15 and 16.

[First Embodiment of Sterilizing and Cleansing Method]

A sterilizing and cleansing method S100 of a water treatment apparatus according to a first embodiment of the present invention will be described with reference to FIG. 15 and FIGS. 2 to 14 illustrating water treatment apparatuses 100 and 200.

As shown in FIG. 15, the sterilizing and cleansing method S100 of the water treatment apparatus according to a first embodiment of the present invention relates to a sterilizing and cleansing method of the water treatment apparatuses 100 and 200 in which purified water, which has been filtered through the filter units 110 and 210, in the storage tanks 170 and 270, and includes a purified water drain step (S110) of draining purified water accommodated in the storage tanks 170 and 270, a sterilization water supply step (S120) of electrolyzing only purified water which has been filtered through at least a portion of the filter units 110 and 210 to generate sterilization water, and supplying the sterilization water to the storage tanks 170 and 270, and a sterilization water discharge step (S140) of discharging the sterilization water accommodated in the storage tanks 170 and 270 from the storage tanks 170 and 270. The method may further include a rinsing water supply step (S150) of supplying rinsing water to the storage tanks 170 and 270 after the sterilization water discharge step (S140), and a rinsing water discharge step (S160) of discharging the rinsing water accommodated in the storage tanks 170 and 270 from the storage tanks 170 and 270.

Here, the sterilization water generated in the sterilization water supply step (S120) may include a mixed oxidant generated by the electrolytic sterilizers 130 and 230 through electrolysis.

Each step will now be described.

In the sterilizing and cleansing method of the water treatment apparatus according to the first embodiment of the present invention, the water treatment apparatus is automatically changed to the sterilization mode at a pre-set time or according to a user's selection.

In the purified water drain step (S110), purified water is sterilized through electrolysis generated by operating the electrolytic sterilizers 130 and 230 and a space for receiving a mixed oxidant is secured.

In the purified water drain step (S110), first, the electrolytic sterilizers 130 and 230 are turned off by the control units 190 and 290, and the flow path changing valve 157 shuts the drain pipe dL and opens the drain lines 151 and 251 under the control of the control units 190 and 290. In this state, the control units 190 and 290 apply an electrical signal to the drain pumps 155 and 255 to operate the drain pumps 155 and 255 to discharge purified water stored in the storage tanks 170 and 270 through the drain lines 151 and 251 by a pumping pressure of the drain pumps 155 and 255 until such time as the water level of the purified water of the storage tanks 170 and 270 reaches a pre-set level, stops the operation of the drain pumps 155 and 255, and then shuts the drain lines 151 and 251 through the flow path changing valve 157. Meanwhile, when the drain pump 155 is not provided, the control unit 190 may operate a drain valve (See 252 in FIG. 8) to open the flow path of the drain line 151. In this case, when sterilization water is introduced into the storage tanks 170 and 270 without the purified water accommodated in the storage tanks 170 and 270 being discharged, an overflow phenomenon may occur in the storage tanks 170 and 270, so in order to prevent the overflow phenomenon, the space allowing for the sterilization water to be introduced is secured.

When the sterilization mode starts, the storage tanks 170 and 270 may be drained to be completely emptied (or sufficiently emptied such that the storage tanks 170 and 270 have a low water level or a water level close to the bottom of the storage tank), but in order to prevent a waste of the purified water and prevent a period of time for performing the overall sterilization mode from being lengthened due to the time required for draining the storage tanks 170 and 270, partial draining is preferred.

In particular, when the purified water drain step S110 is simultaneously performed together with the sterilization water supply step (S120) (to be described), the overall time for performing the sterilization mode can be further shortened. In this case, purified water is discharged from the lower ends of the storage tanks 170 and 270 and sterilization water is introduced to the upper ends of the storage tanks 170 and 270. Here, since the outflow speed of the purified water is much faster than the inflow speed of the sterilization water, the influence of the inflow of the sterilization water on the purified water drain step S110 is negligible.

For such a partial draining operation of the purified water, the middle water level sensors 175b and 275b are installed at a slightly lower side of the high water level sensor 175c in the storage tanks 170 and 270, and the draining may be performed until such time as the middle water level sensors 175b and 275b sense a middle water level, or alternatively, the drain lines 151 and 251 may be open only for a certain period of time in consideration of an amount of drainage water.

In order to only open the drain lines 151 and 251 for a certain period of time, the flow path changing valve 157 illustrated in FIG. 6 may change a flow path such that it is connected to the drain pipe dL side, or the drain valve 252 illustrated in FIGS. 8 to 14 may be open for a certain period of time, and at the same time, the drain pumps 155 and 255 may be operated for only a certain period of time.

In particular, when the middle water level sensors 175b and 275b are in use, the capacity of water accommodated in the storage tanks 170 and 270 can be accurately checked, so after the sterilization water including a mixed oxidant is introduced to be mixed in the storage tanks 170 and 270, the concentration of the mixed oxidant included in the entirety of the storage tanks 170 and 270 can be adjusted to a pre-set value as close as possible. Thus, the phenomenon in which more mixed oxidant is introduced to the storage tanks 170 and 270 than is necessary, to worsen the taste of water due to the excessive amount of residual mixed oxidant after the rinsing operation can be prevented, and the phenomenon in which the effect of the sterilization and cleansing is reduced due to the mixed oxidant of less than a proper concentration can be also prevented.

In the sterilization water supply step (S210), sterilization water is generated by the electrolytic sterilizers 130 and 230 and supplied to the storage tanks 170 and 270.

To this end, the control units 190 and 290 open the raw water cutoff valve WV to allow raw water to be introduced and filtered. At this time, in case of the water treatment apparatus 100 illustrated in FIGS. 2 to 6, an electrical signal is applied to the flow path changing valve 120, and in case of the water treatment apparatus 100 illustrated in FIGS. 8 to 14, the second switching valve 222 is open in a state in which the first switching valve 221 is shut, in order to connect the flow path at a front stage of the RO membrane filter 113, i.e., the flow paths before the RO membrane filters 113 and 213, namely, the flow path between the sediment filter 111 and the pre-carbon filter 112, the flow path between the pre-carbon filter 112 and the RO membrane filter 113 or the flow path between the complex filter 211 and the RO membrane filter 213, and the sterilization water line 142 in order to allow purified water which has been filtered by the sediment filter 111, by both the sediment filter 111 and the pre-carbon filter 112, or by the complex filter 211 to flow into the electrolytic sterilizers 130 and 230. Here, as described above in the foregoing embodiments of the water treatment apparatuses 100 and 200, a hollow fiber membrane filter, instead of the RO membrane filter 113, may be installed.

Meanwhile, the sediment filter 111 serves to adsorb and remove solid substances, such as floating matter, sand, or the like, having relatively large particles included in the raw water, and the pre-carbon filter 112 serves to remove chemical materials, such as volatile organic compounds, carcinogenic substances, synthetic detergents, insecticides, or the like, harmful to a human body, and a residual chlorine (e.g., HOCl or ClO) component included in the water through an active carbon absorption method, so the chloride ions Cl⁻ included in the raw water can be maintained as it is (approximately 10 to 20 ppm although it is different according to raw water), although they pass through the sediment filter 111 and the pre-carbon filter 112. In this case, the sediment filter 111 and the pre-carbon filter 112 may be provided as the complex filter 211 as shown in FIG. 8.

In particular, the active carbon filter such as the pre-carbon filter 112 contains a mineral component, so water passing through the active carbon dissolves an inorganic substance of the active carbon to assume alkalescence (i.e., weak alkaline water). The alkaline water, having reducing power, reduces the residual chlorine ($Cl_2$, HOCl, ClO) in the water into chloride ions (Cl⁻) harmless to a human body, and various harmful materials are adsorbed to the pores of the active carbon, thus removing impurities or chemical materials in the water.

Thus, the purified water which has been filtered through the sediment filter 111 or through both the sediment filter 111 and the pre-carbon filter 112 has the concentration of chloride ions almost similar to that of raw water (e.g., approximately 10 to 20 ppm), and as the chloride ions and other materials included in the purified water which have passed through the sediment filter 111 or the sediment filter 111 and the pre-carbon filter 112 are electrolyzed (oxidation-reduction reaction) by the electrolytic sterilizers 130 and 230, a mixed oxidant is generated. In particular, the purified water which has only passed through the sediment filter 111 or which has passed through the sediment filter 111 and the pre-carbon filter 112, or which has passed through the complex filter 211, includes a large amount of total dissolved solids (TDS) (the amount of solids including mineral components such as calcium, magnesium, iron, or the like, dissolved in water), providing the conditions in which the electrolysis reaction (oxidation-reduction reaction) can be smoothly performed by the electrolytic sterilizers 130 and 230.

Meanwhile, when the purified water passes through the RO membrane filter 113, a significant amount of the solids is removed to damp the smooth electrolysis reaction (oxidation-reduction reaction), which thus requires a high voltage, and in addition, since a large amount of materials, such as chloride ions, or the like, required for generating the mixed oxidant is also removed to lower the concentration of the mixed oxidant so as not to be sufficient for sterilization.

In this manner, the purified water supplied through the sediment filter 111 positioned at the front stage of the RO membrane filters 113 and 213, through the sediment filter 111 and the pre-carbon filter 112, or through the complex filter 211 includes the large amount of TDS and has a state of having chloride ions of a similar level to that of raw water, and the purified water having such a phase is supplied to the electrolytic sterilizers 130 and 230.

For example, the concentration of chloride ions included in the purified water which has only passed through the sediment filter 111, through both the sediment filter 111 and the pre-carbon filter 112, or through the complex filter 211, is almost equal to the concentration (in general, 10 to 20 ppm) of the chloride ions included in raw water, so a sufficient amount of chloride ions can be introduced into the electrolytic sterilizers 130 and 230, and since the electrolyte, i.e., the TDS, required for electrolysis is sufficient, the sterilization water including the mixed oxidant of 2 to 3 ppm can be generated by regulating the inflow capacity (liter/min.) of purified water introduced into the electrolytic sterilizers 130 and 230, current, voltage, and the like. This may be verified through experimentation.

In particular, as shown in FIGS. 8 to 14, when the constant flow rate valve 223 for decompressing purified water and supplying a constant flow rate is installed at a front stage of the electrolytic sterilizer 230, sterilization water can be more stably generated by the electrolytic sterilizers 130 and 230.

Meanwhile, even when the amount of TDS included in the purified water which has only passed through the sediment filter 111, through both the sediment filter 111 and the pre-carbon filter 112, or through the complex filter 211 is overly greater than an appropriate range (e.g., even when it exceeds 30 ppm), a mixed oxidant having a stable concentration can be generated by controlling the voltage and/or current of the electrolytic sterilizers 130 and 230.

As discussed above, the electrolytic sterilizers 130 and 230 have a sufficient amount of chloride ions, and can only electrolyze purified water introduced without additional electrolytes, e.g., chloride (sodium chloride, potassium chloride, etc.) to generate high concentration mixed oxidants, and since the concentration of the TDS is high, the electrolytic sterilizers 130 and 230 can generate the mixed oxidants having a sufficient concentration required for sterilization even with a low current or low voltage driving.

Meanwhile, since the purified water which has passed through only the sediment filter 111, through both the sediment filter 111 and the pre-carbon filter 112, or through the complex filter 211 is introduced to the electrolytic sterilizers 130 and 230, even when a hollow fiber membrane filter, a micro-filter, or the like, instead of the RO membrane filters 113 and 213, is used, the mixed oxidant having a sufficient concentration required for sterilization can be generated with a low current or at a low voltage.

The high concentration (e.g., 2 to 3 ppm) sterilization water generated by the electrolytic sterilizers 130 and 230 is supplied to the storage tanks 170 and 270 through the sterilization water lines 142 and 242 until the water level of the storage tanks 170 and 270 reaches a high water level (S130). Namely, preferably, the sterilization water is supplied up to the high water level in order to sterilize and cleanse the upper parts of the storage tanks 170 and 270.

As the high concentration sterilization water supplied to the storage tanks 170 and 270 is mixed with the purified water accommodated in the storage tank 170, the mixed oxidant having a certain concentration comes in contact with an inner wall of each of the storage tanks 170 and 270, whereby the inner walls of the storage tanks 170 and 270 can be sterilized by the sterilization water. For example, when the concentration of the mixed oxidant included in the sterilization water supplied to the storage tanks 170 and 270 is 2 to 3 ppm, it can be mixed with the purified water remaining in the storage tanks 170 and 270 to adjust the concentration of the mixed oxidant to be 0.05 to 0.15 ppm, expectedly achieving sterilization efficiency. In particular, considering that the concentration of the mixed oxidant required for sterilization is 0.05 ppm, preferably, the concentration of the mixed oxidant within the storage tanks 170 and 270 in the wake of the inflow of the sterilization water is adjusted to be approximately 0.07 to 0.13 ppm, slightly higher than 0.05 ppm, to obtain a stable sterilization effect.

When the sterilization water provided to the storage tanks 170 and 270 is at a high water level, a corresponding detection signal of the high water level sensor 175c is output to the control units 190 and 290, and the control units 190 and 290 shut the raw water cutoff valve WV.

As mentioned above, when the supply of the sterilization water to the storage tanks 170 and 270 is completed, the sterilization water discharge step (S140) is performed.

In the sterilization water discharge step (S140), when the storage tank 170 has a high water level according to the inflow of the sterilization water or after the lapse of a certain period of time from the point in time at which the storage tank 170 has a high water level, the sterilization water may be discharged to the outside.

At this time, the control units 190 and 290 apply an electrical signal to the drain pumps 155 and 255 to operate the drain pumps 155 and 255, and at the same time, apply an electrical signal to the flow path changing valve 157 to open the drain line 151 toward the concentrated water discharge side (FIGS. 2 to 6) or open the discharge valve 252 (FIGS. 8 and 9).

Then, the sterilization water stored in the storage tanks 170 and 270 is discharged as concentrated water at a high speed through the drain lines 151 and 251 by the pumping pressure of the drain pumps 155 and 255. In particular, the use of the drain pumps 155 and 255 enables a rapid draining operation and is able to shorten time required for sterilization and cleansing.

As for the draining operation of the sterilization water, it may be configured such that after the draining operation is performed during a pre-set period of time, the operation of the drain pumps 155 and 255 is interrupted, but preferably, in order to prevent the drain pumps 155 and 255 from being driven for a longer time than necessary, the control units 190 and 290 may detect a generation of an overload to the drain pump 155 due to a termination of drainage of the storage tanks 170 and 270 to thus terminate the draining operation.

Meanwhile, as shown in FIGS. 6, 13 and 14, sterilization water accommodated in the storage tanks 170 and 270 may be discharged through the water intake cocks 159, 259a, and 259b, and in this case, the sterilization water may be introduced into the drain lines 151 and 251 through the connection members 180 and 280 and the valve connectors 159, 259a, 259b, and 259c, and then discharged to the outside. In this manner, when the sterilization water is discharged through the water intake cocks 159, 259a, and 259b, the water intake cocks 159, 259a, and 259b can be sterilized and cleansed. In addition, since sterilization water from the water intake cocks 159, 259a, and 259b can be discharged to the drain pipe dL of the filter units 110 and 210 by simply connecting the water intake cocks 159, 259a, and 259b and the valve connectors 159, 259a, 259b, and 259c through the connection members 180 and 280, the water intake cocks 159, 259a, and 259b can be easily sterilized and cleansed without having to use a waterspout member.

When the sterilization water is completely drained, the rinsing water supply step (S150) may be performed, and in this case, the control units 190 and 290 may open again the raw water cutoff valve WV to perform a rinsing operation.

However, as mentioned above, since the concentration of the mixed oxidant in the storage tanks 170 and 270 is approximately 0.05 to 0.15 ppm in the sterilization, a very small amount of the mixed oxidant remains in the storage tanks 170 and 270 after the sterilization water is drained, and when purified water is re-introduced to the storage tanks 170 and 270 later, the concentration of the mixed oxidant is so low that the mixed oxidant cannot be detected and the user cannot sense a change in the taste of water due to the mixed oxidant, so a rinsing operation may not be performed. In particular, in the present embodiment, since only purified water is electrolyzed, without supplying chloride, even in the case that the sterilization material is ingested, it is not harmful to the human body.

However, in order to ensure the reliable elimination of the mixed oxidant, or the like, the rinsing operation may be performed.

The rinsing water supply step (S150) is performed by filtering raw water supplied through the sediment filter 111, through both the sediment filter 111 and the pre-carbon filter 112, or through the complex filter 211, and then supplying the filtered water to the storage tanks 170 and 270. Here, the purified water supplied to the storage tanks 170 and 270 is supplied through the sterilization water lines 142 and 242, but since the electrolytic sterilizers 130 and 230 are in an OFF state, sterilization water is not generated.

In this case, in order to prevent a waste of water, accelerate the supply of rinsing water, and prevent unfiltered raw water from being introduced as it is to the storage tanks 170 and 270, purified water, which has been filtered through the filters provided at the front stage of the RO membrane filters 113 and 213, e.g., through the sediment filters 111 and 211, through the sediment filters 111 and 211 and the pre-carbon filters 112 and 212, or through the complex filter 211, may be used as the rinsing water.

Meanwhile, in order to perform the rinsing operation, purified water may be supplied to the storage tank 170 up to the high water level water. However, when purified water is supplied up to the high water level, excessive time may be required for supplying purified water (rinsing water) and the drainage thereof, and a large amount of water may be wasted. Thus, in the present embodiment, in performing the rinsing operation, it is effective in the case that the amount of purified water (rinsing water) supplied to the storage tanks 170 and 270 is sufficient to rinse the bottom surface of the storage tanks 170 and 270 on which sterilization water may mostly remain in draining the sterilization water (e.g., purified water of about 0.1 to 0.5 liters may be supplied). To this end, a pre-set amount, smaller than the amount corresponding to the high water level of the storage tanks 170 and 270, of purified water (rinsing water) may be supplied to the storage tanks 170 and 270. For example, it may be sufficient to supply purified water by a water level lower than the low water level which can be sensed by the low water level sensors 175a and 275a.

When the supply of the rinsing water is finished, the rinsing water discharge step (S160) is performed. The rinsing water discharge step (S160) is basically performed according to the same mechanism as that of the sterilization water discharge step (S140), so a detailed description thereof will be omitted.

In the rinsing water discharge step (S160), the use of the discharge pumps 155 and 255 can shorten time required for discharging rinsing water, and it may be configured such that the rinsing water discharge step S160 is terminated when the control units 190 and 290 detect an overload generated in the discharge pumps 155 and 255 due to a termination of drainage of the storage tanks 170 and 270, thus preventing the discharge pumps 155 and 255 from being driven for a long period of time.

Thereafter, a purified water re-supply step S170 is performed. In this step, purified water, which has passed through all of the filters 110 and 210, is re-supplied to the storage tanks. Then, the sterilizing and cleansing method S100 is terminated.

[Second Embodiment of Sterilizing and Cleansing Method]

A sterilizing and cleansing method S200 of a water treatment apparatus according to a second embodiment of the present invention will be described with reference to FIG. 16 and FIGS. 10 to 14 illustrating the water treatment apparatuses 100 and 200.

As shown in FIG. 16, the sterilizing and cleansing method S200 of a water treatment apparatus according to the second embodiment of the present invention is basically the same as the sterilizing and cleansing method S100 illustrated in FIG. 15 and is different in the configuration of the sterilization water discharge step S140. Thus, in order to avoid unnecessary repetition, a detailed description of the same or similar configuration will be omitted, and only the differences will be described.

As shown in FIG. 16, the sterilization water discharge step S140 includes a discharge start step S141 of discharging sterilization water from the storage tank 270, a circulative sterilization step S143 of circulating sterilization water discharged from the storage tank 270 to the flow path provided within the water treatment apparatus, and an external discharge step S145 of discharging sterilization water which has performed the circulative sterilization to the outside.

The respective steps of the fifth embodiment of the water treatment apparatus illustrated in FIGS. 10 and 11 and respective steps of the sixth embodiment of the water treatment apparatus illustrated in FIGS. 13 and 14 will now be described.

First, in the fifth embodiment of the water treatment apparatus 200 illustrated in FIGS. 10 and 11, in the discharge start step S141, sterilization water accommodated in the storage tank 270 is directly discharged to the drain line 251. The discharge start step is performed when the control unit 290 opens the drain valve 252.

In the circulative sterilization step S143, sterilization water, which has been discharged to the drain line 251 according to the opening of the drain valve 252, is introduced to the circulation line 243 through the flow path changing valve 253 and then re-introduced to the storage tank 270 through the purified water line 241. In this process, the purified line 241, the drain line 251, and the circulation line 243, as well as the storage tank 270, are sterilized and cleansed.

In the external discharge step S145, the sterilization water which has performed the circulative sterilization for a certain period of time is discharged to the outside. This step is performed in the same manner as the sterilization water discharge step S140 illustrated in FIG. 15, so a detailed description thereof will be omitted.

In the sixth embodiment of the water treatment apparatus 200 illustrated in FIGS. 13 and 14, in the discharge start step S141, the sterilization water accommodated in the storage tank 270 is discharged to the drain line 251 through the water intake cocks 279a and 279b. First, the connection member 280 is installed, the drain valve 252 is shut by the control unit 290, and then, the water intake valves 277a, 277b, and 277c, are open, thus performing the discharge start step S141.

In the circulative sterilization step S143, as the water intake valves 277a, 277b, and 277c are open, sterilization water is introduced to the drain line 251 through the water intake cocks 279a and 279b, the connection member 270, and the valve connectors 259a, 259b, and 259c. The sterilization water, which has been introduced to the drain line 251, flows to the circulation line 243 through the flow path changing valve 253 and then is re-introduced to the storage tank 270 through the purified water line 241. In this process, the water intake cocks 279a and 279b, the purified water line 241, the drain line 251, and the circulation line 243, as well as the storage tank 270, are sterilized and cleansed.

In the external discharge step S145, the sterilization water, which has performed circulative sterilization for a certain period of time, is discharged to the outside. This step is performed in the same manner as the sterilization water discharge step S140 illustrated in FIG. 15, so a detailed description thereof will be omitted.

[Third Embodiment of Sterilizing and Cleansing Method]

Meanwhile, in case of the water treatment apparatuses 100 and 200 according to the seventh embodiment of the present invention as described above, the electrolytic sterilizers 130 and 230 or the electrolytic sterilizer 130 and 230 and the sterilization lines 142 and 242 may be detachably attached.

The third embodiment of the sterilizing and cleaning method of a water treatment apparatus is the same as the first and second embodiments of the sterilizing and cleaning method, except that a process of connecting the electrolytic sterilizers 130 and 230 to the water treatment apparatuses 100 and 200 is performed before sterilization water is generated through the electrolytic sterilizers 130 and 230. Thus, in order to avoid unnecessary repetition, a detailed description of the same or similar configuration will be omitted, and only the difference will be described.

In the third embodiment of the sterilizing and cleansing method according to the present invention, in order to generate sterilization water by the electrolytic sterilizers 130 and 230, one side of the electrolytic sterilizers 130 and 230 is connected to the flow path provided in the interior of the filter unit 110, and the other side of the electrolytic sterilizers 130 and 230 is connected to the storage tanks 170 and 270.

In detail, the electrolytic sterilizers 130 and 230 supply step S120 includes the process of connecting one side of the electrolytic sterilizers 130 and 230 to the flow path between the sediment filter 111 and the pre-carbon filter 112, the flow path between the pre-carbon filter 112 and the RO membrane filter 113, or the flow path between the complex filter 211 and the RO membrane filter 213 through a known connection means such as fitting, or the like, and connecting the other side of the electrolytic sterilizers 130 and 230 to the flow path between the post-carbon filters 114 and 214 and the storage tanks 170 and 270 through a known connection means.

In this case, as shown in FIGS. 8 to 14, when the constant flow rate valve 223 for making a flow rate introduced to the electrolytic sterilizer 230 constant (or uniform) is installed at a front stage of the electrolytic sterilizer 230, preferably, the electrolytic sterilizer 230 may be detachably attached together with the constant flow rate valve 223.

Also, in step S150 of supplying rinsing water to the storage tanks 170 and 270, purified water, which has passed through only a portion of the filters units 110 and 210, may be introduced to the storage tanks 170 and 270 through the electrolytic sterilizers 130 and 230 in a state in which the electrolytic sterilizers 130 and 230 are not driven. In this case, the electrolytic sterilizers 130 and 230 may be driven manually or the electrolytic sterilizers 130 and 230 may be connected to the control unit 190 through a fixed line or wirelessly, whereby the driving of the electrolytic sterilizers 130 and 230 can be automatically controlled.

While the present invention has been shown and described in connection with the exemplary embodiments, it will be apparent to those skilled in the art that modifications and variations can be made without departing from the spirit and scope of the invention as defined by the appended claims.

The invention claimed is:

1. A water treatment apparatus comprising:
   a filter unit purifying raw water input into the water treatment apparatus, the filter unit comprising two or more filters configured to filter the raw water, wherein the two or more filters are connected to each other by a plurality of flow paths;
   a flow path changing valve comprising a water inlet, a first water outlet and a second water outlet, with the water inlet being fixedly connected to an output of only a portion of the two or more filters, wherein the flow path changing valve is configured to connect the water inlet to one of the first water outlet and the second water outlet;
   a storage tank connected to the filter unit and configured to store purified water which has been filtered by all of the two or more filters of the filter unit, when the water treatment apparatus is in a water purification mode;
   a sterilization water line configured to connect an output of fewer than all of the two or more filters to the storage tank when the water treatment apparatus is in a water sterilization mode;
   an electrolytic sterilizer installed in the sterilization water line, the electrolytic sterilizer configured to generate sterilization water including a sterilizing material by electrolyzing the raw water filtered by fewer than all of the two or more filters of the filter unit in the sterilization mode;
   a drain unit connected to the storage tank, the drain unit configured to discharge water accommodated in the storage tank; and
   a control unit configured to control the flow path changing valve,
   wherein, when in the water purification mode, the control unit controls the flow path changing valve to output purified water filtered by all of the two or more filters of the filter unit to the storage tank, and, when in the sterilization mode, the control unit controls the flow path changing valve to output the sterilization water filtered through fewer than all of the two or more filters of the filter unit to the storage tank,
   wherein the sterilization water passes through the electrolytic sterilizer, and the sterilization water is supplied to the storage tank and is discharged from the storage tank through the drain unit or a water extraction cock connected to the storage tank,
   wherein the sterilization water line is configured as a flow path separate from a purified water line connecting a final filter of the two or more filters of the filter unit to the storage tank,
   wherein the sterilization water line is without a filter at a rear stage of the electrolytic sterilizer so that the sterilization water is fed to the storage tank without passing through any filters of the filter unit when in the sterilization mode,
   wherein, in the sterilization mode, the control unit is configured to discharge the sterilization water supplied in the storage tank through the water extraction cock,
   wherein the water extraction cock is connected to a drain line of the drain unit through a connection member, and
   wherein the connection member comprises a first connection cap detachable with respect to a discharging end of the water extraction cock, a second connection cap detachable with respect to the drain unit, and a connection hose connecting the first and second connection caps.

2. The apparatus of claim 1, wherein the filter unit comprises a reverse osmosis (RO) membrane filter, and the sterilization water line is diverged from a flow path bypassing the RO membrane filter and connects a front stage of the RO membrane filter to the storage tank, and
   wherein the final filter is different from the RO membrane filter.

3. The apparatus of claim 1, wherein the filter unit comprises a hollow fiber membrane filter, and the sterilization water line bypasses the hollow fiber membrane filter and connects a front stage of the hollow fiber membrane filter to the storage tank, and
   wherein the final filter is different from the hollow fiber membrane filter.

4. The apparatus of claim 2, wherein the electrolytic sterilizer is detachably provided.

5. The apparatus of claim 1, wherein the electrolytic sterilizer is detachably provided.

6. The apparatus of claim 3, wherein the electrolytic sterilizer is detachably provided.

7. The apparatus of claim 1, wherein the storage tank comprises a first storage unit storing purified water which has passed through the filter unit, the first storage unit being connected to a first water extraction line, and a second storage unit storing the purified water supplied from the first storage unit by changing the temperature of the purified water, the second storage unit being connected to a second water extraction line, wherein the first and second water extraction lines are connected to a water extraction cock.

8. The apparatus of claim 1, wherein a circulation line for re-supplying sterilization water drained through the drain line to the storage tank is provided between a drain line of the drain unit and a water line connecting the final filter provided in the filter unit and the storage tank, or is provided between the drain line and a water line located at a front stage of the final filter of the filter unit.

9. The apparatus of claim 1, wherein the electrode body of a positive electrode and that of a negative electrode provided to the electrolytic sterilizer are made of titanium (Ti), and the electrode body of the positive electrode is coated with ruthenium (Ru).

* * * * *